United States Patent
Komaki et al.

(10) Patent No.: US 7,215,464 B1
(45) Date of Patent: May 8, 2007

(54) OPTICAL AMPLIFIER

(75) Inventors: Kosuke Komaki, Kawasaki (JP); Hiroyuki Itoh, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/396,551

(22) Filed: Apr. 4, 2006

(30) Foreign Application Priority Data

Nov. 16, 2005 (JP) ............................. 2005-331269

(51) Int. Cl.
H04B 4/00 (2006.01)
H04B 10/12 (2006.01)

(52) U.S. Cl. ............................. 359/341.44; 359/337.5; 398/10; 398/11; 398/13; 398/17; 398/18; 398/20; 398/38

(58) Field of Classification Search ............. 359/337.5, 359/341.44; 398/17, 18, 20, 10, 11, 13, 38
See application file for complete search history.

(56) References Cited

U.S. PATENT DOCUMENTS

| | | | |
|---|---|---|---|
| 6,411,429 B1 * | 6/2002 | Tomofuji et al. ............. 359/337 |
| 6,433,925 B1 * | 8/2002 | Sakano et al. ......... 359/341.43 |
| 6,441,955 B1 * | 8/2002 | Takatsu et al. .......... 359/341.4 |
| 6,496,300 B2 * | 12/2002 | Kinoshita et al. ........... 398/160 |
| 6,532,103 B1 * | 3/2003 | Sakano et al. ......... 359/337.11 |
| 6,919,987 B2 * | 7/2005 | Takatsu et al. .......... 359/341.4 |
| 7,002,735 B2 * | 2/2006 | Kobayashi et al. .... 359/341.44 |
| 2002/0027703 A1 * | 3/2002 | Kinoshita et al. ........ 359/337.1 |
| 2002/0051284 A1 * | 5/2002 | Takatsu et al. .......... 359/341.1 |
| 2003/0035171 A1 * | 2/2003 | Touma ........................ 359/124 |
| 2003/0099432 A1 * | 5/2003 | Furuki et al. ................. 385/24 |
| 2003/0099475 A1 * | 5/2003 | Nemoto et al. ............... 398/83 |
| 2004/0100688 A1 | 5/2004 | Iizuka et al. |

OTHER PUBLICATIONS

Patent Abstracts of Japan, Publication No. 10-051057, Published Feb. 20, 1998.
Patent Abstracts of Japan, Publication No. 2002-368698, Published Dec. 20, 2002.

* cited by examiner

Primary Examiner—Deandra Hughes
Assistant Examiner—Eric Bolda
(74) Attorney, Agent, or Firm—Staas & Halsey LLP

(57) ABSTRACT

Optical amplifier which can eliminate the need for an optical detection section before an external attenuating medium, can prevent SN degradation, and can reduce power required for pumping light. An attenuation amount detection section detects an amount of signal light attenuation caused by a variable optical attenuator and the external attenuating medium connected in series, by means of a front optical detection section provided before the variable optical attenuator and the external attenuating medium and a back optical detection section provided thereafter. An attenuation amount control section controls the variable optical attenuator such that the amount of signal light attenuation detected by the attenuation amount detection section is kept constant. A connection detection section detects a connection or disconnection of the external attenuating medium in accordance with the amount of signal light attenuation obtained when the amount of attenuation caused by the variable optical attenuator is minimized.

10 Claims, 15 Drawing Sheets

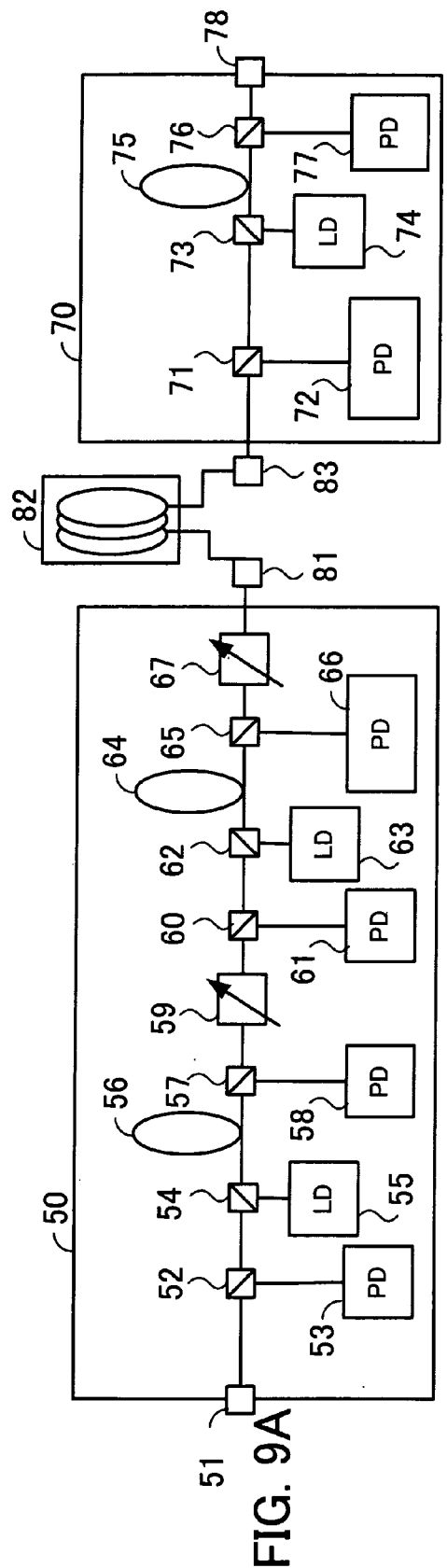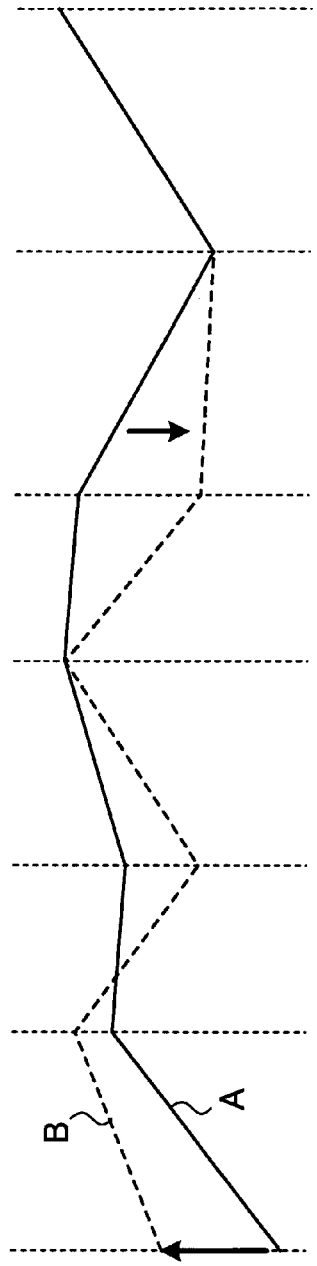
FIG. 9A
FIG. 9B

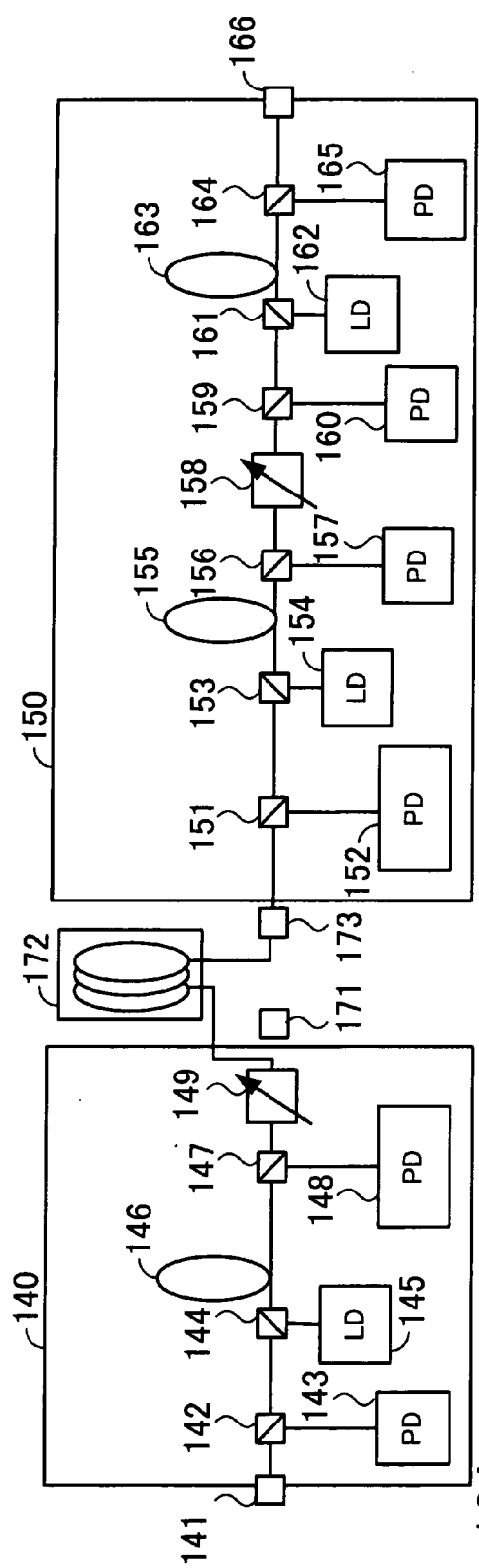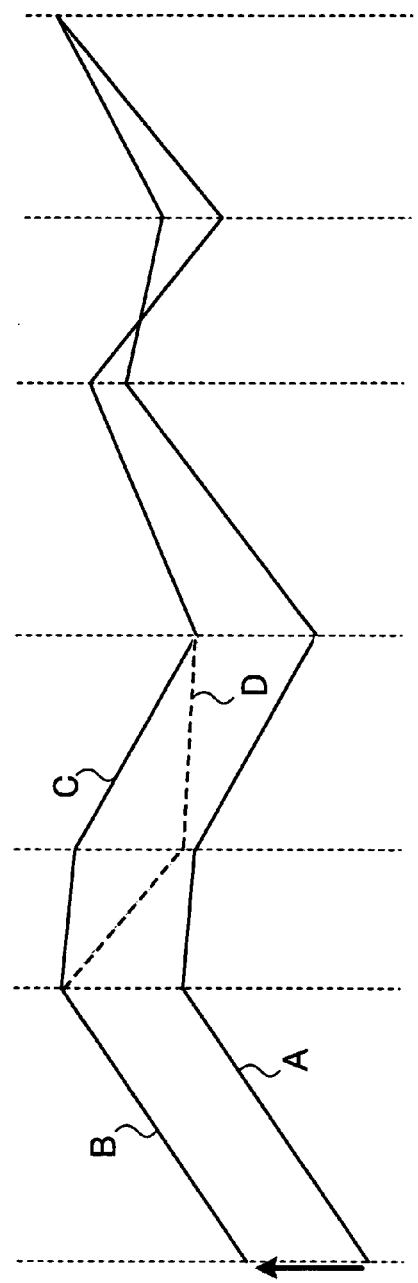
FIG. 12A
FIG. 12B

OPTICAL AMPLIFIER

CROSS-REFERENCE TO RELATED APPLICATIONS

This application is based upon and claims the benefits of priority from the prior Japanese Patent Application No. 2005-331269, filed on Nov. 16, 2005, the entire contents of which are incorporated herein by reference.

BACKGROUND OF THE INVENTION

1. Field of the Invention

The present invention relates to optical amplifiers, and particularly to an optical amplifier including a variable optical attenuator and an external attenuating medium connected in series.

2. Description of the Related Art

In optical wavelength multiplex transmission systems, an erbium-doped fiber amplifier (EDFA) is generally used as an optical amplifier used for a transmitter or a repeater. The EDF optical amplifier has a set signal gain determined by the signal gain characteristics of the EDF (such as dependence of gain on the wavelength). Accordingly, the amplifier includes a variable optical attenuator (VOA) for absorbing changes in amplifier gain and interstage losses such as an insertion loss of a dispersion compensating optical fiber (DCF) (refer to Japanese Unexamined Patent Publication Nos. 2004-72062 and H10-51057). When the amplifier gain or interstage loss decreases, the loss by the VOA is increased by the amount of decrease.

The demand for optical amplifiers having a wide dynamic range (7 to 16 dB, for instance) has been growing to keep up with a wide variety of user requirements for system gain. The VOA loss range must be increased accordingly, but a great VOA loss range would worsen the noise factor. To avoid the problem, two stages of VOAs are configured.

FIG. 13A is a block diagram of a conventional optical amplifier. The shown optical amplifier has two stages of VOAs. Signal light is input to an input terminal 201 shown in FIG. 13A. The input signal light is output through a coupler 202 to an EDF 204. The coupler 202 combines the signal light with pumped light from a laser diode (LD) 203 and outputs the combined light to the EDF 204. Now, the signal light has a gain depending on the power of the pumped light. A VOA 205 attenuates the signal light output from the EDF 204. A coupler 206, an LD 207, and an EDF 208 are analogous to the coupler 202, the LD 203, and the EDF 204. Couplers 212 and 216, LDs 213 and 217, EDFs 214 and 218, and a VOA 215 are analogous to the corresponding elements between the input terminal 201 and an output terminal 209. Amplified signal light is output from an output terminal 219. A DCF 210 is connected to terminals 209 and 211 and compensates for wavelength dispersion of the signal light output from the EDF 208.

FIG. 13B shows the level of signal light varying in different stages of the optical amplifier shown in FIG. 13A. The height of waveforms A and B in FIG. 13B represents the level of light (in units of dBm, for instance), and vertical dotted lines are separators between different stages of the optical amplifier shown in FIG. 13A.

If the level of signal light input to the input terminal 201 is originally represented by waveform A and increased as represented by waveform B, the gain of the EDF 204 decreases to reduce the level of signal light (the inclination of waveform B is smaller than the inclination of waveform A). Because the total gain of the EDF 204 and the EDF 208 must be kept constant because of the EDF signal gain characteristics, the gain of the EDF 208 needs to be increased by the amount of decrease in gain of the EDF 204. (The inclination of waveform B becomes greater than the inclination of waveform A, between the input and output of the EDF 208.) Squares or circles in the figure represent that the marked segments have the same inclination, which means that the total gain of the EDF 204 and the EDF 208 is kept constant.

The level of light at the terminal 209 must also be kept constant, so that the amount of loss (attenuation) by the VOA 205 becomes as represented by waveform B, which is greater than that of waveform A. The same configuration is provided between the terminal 211 and the output terminal 219. The VOA loss range collectively provided by the VOA 205 and the VOA 215 prevents the noise factor from becoming worse.

When a change in interstage loss (change in loss across the DCF 210) becomes 10 dB or greater, the loss range of the VOA 215 would increase in the configuration shown in FIG. 13A.

Suppose that the amount of loss in level of light between the input and output of the DCF 210 becomes as represented by waveform B, which is smaller than that represented by waveform A (the inclination of waveform B becomes smaller than the inclination of waveform A). In other words, suppose that the level of signal light input to the terminal 211 increases. The gain of the EDF 214 would decrease because of the upper limit of power of the LD 213, then the gain of the EDF 218 should be increased under constant sum gain control. Because a constant (target) level of signal light must be obtained at the output terminal 219, the amount of loss by the VOA 215 increases by the amount of decrease in loss by the DCF 210. This would worsen the noise factor, depending on the amount of decrease in power input to the EDF 218, and the LD 217 should have a great power. To avoid this problem, the VOA and the DCF are connected in series.

FIG. 14A is a block diagram of an optical amplifier in which a VOA and a DCF are connected in series. In the optical amplifier shown in FIG. 14A, a VOA 229 and a DCF 231 are connected in series. The DCF 231 is connected to terminals 230 and 232. Couplers 222 and 226, LDs 223 and 227, EDFs 224 and 228, and a VOA 225 are analogous to the couplers 202 and 206, the LDs 203 and 207, the EDFs 204 and 208, and the VOA 205 in FIG. 13A. In the optical amplifier shown in FIG. 14A, the single VOA 225 absorbs the dynamic range. No VOA is connected after the DCF 231, between an EDFA including a coupler 233, an LD 234, and EDF 235 and another EDFA including a coupler 236, an LD 237, and an EDF 238. Signal light is input to an input terminal 221 and output from an output terminal 239.

FIG. 14B shows the level of signal light varying in different stages of the optical amplifier shown in FIG. 14A. The height of waveforms A and B in FIG. 14B represents the level of light, and vertical dotted lines are separators between different stages of the optical amplifier shown in FIG. 14A.

The operation from the input terminal 221 to the EDF 228 is the same as the operation of the amplifier shown in FIG. 13. If the amount of loss by the DCF 231 becomes as represented by waveform B, decreased from the amount represented by waveform A, the amount of loss by the VOA 229 is increased by the amount of decrease so that the level of signal light is kept constant at the terminal 232. The noise factor can be prevented from becoming worse by connecting the VOA 229 and the DCF 231 in series to keep the level of light after the DCF 231 constant.

The DCF 231 is directly connected and disconnected by the user. The connection or disconnection of the DCF 231 must be confirmed by checking the amount of loss before and after the DCF 231. Accordingly, an optical detection section for detecting the level of light, such as a photo diode (PD), must be provided before and after the DCF 231.

FIG. 15 is a block diagram of an optical amplifier which can detect the connection or disconnection of a DCF. In the shown optical amplifier, signal light input to an input terminal 241 passes one EDF 246, a DCF 253, and another EDF 259 and is output from an output terminal 262.

Couplers 242 and 247 branch signal light into a PD 243 and a PD 248 respectively, and the PD 243 and the PD 248 convert the light to an electric signal. An AGC 271 adjusts the pumped light of an LD 245 in accordance with the electric signals of the PD 243 and the PD 248, or the levels of signal light before and after the EDF 246. The pumped light is input through a coupler 244 to the EDF 246. Couplers 255, 257, and 260, PDs 256 and 261, an LD 258, and an AGC 273 after the DCF 253 function in the same way. The AGC 271 and the AGC 273 bring the signal light to a target level at the output terminal 262. An interstage loss control block 272 controls a VOA 249 to keep the total gain of the EDF 246 and the EDF 259 constant.

The interstage loss control block 272 monitors the level of light before and after the DCF 253, in accordance with the level of light branched by a coupler 250 and detected by a PD 251 and the level of light branched by the coupler 255 and detected by the PD 256. Then, the interstage loss control block 272 detects a disconnection (of the DCF 253 from terminals 252 and 254) or a connection (of the DCF 253 to the terminals 252 and 254), in accordance with the level of light before and after the DCF 253.

To detect the connection or disconnection of an external attenuating medium (in this example, the DCF 253) to be connected or connected in series with a variable optical attenuator (in this example, the VOA 249), an optical detection section (in this example, the PD 251 and the PD 256) must be provided before and after the external attenuating medium. If the optical detection section is provided before the variable optical attenuator and after the external attenuating medium, the varying amount of attenuation by the variable optical attenuator makes it impossible to check the connection or disconnection of the external attenuating medium in accordance with the correct amount of loss by the external attenuating medium.

The detection section provided before and after the external attenuating medium, however, requires that the signal light is branched into the detection section, and the loss depending on the branching ratio would lead to SN degradation.

For instance, the PD 251 provided before the DCF 253 shown in FIG. 15 would provide a loss depending on the branching ratio and cause SN degradation accordingly.

To prevent SN degradation, signal light must be amplified by the amount of loss depending on the branching ratio, and a higher LD power is required. This would reduce the cost effectiveness and would increase power consumption because of LD temperature control.

SUMMARY OF THE INVENTION

In view of the foregoing, it is an object of the present invention to provide an optical amplifier which eliminates the need for an optical detection section before and after an external attenuating medium, does not cause SN degradation, and does not increase the power of the LD.

To accomplish the above object, according to one aspect of the present invention, there is provided an optical amplifier including a variable optical attenuator and an external attenuating medium connected in series. This optical amplifier includes the following elements: an attenuation amount detection section for detecting the amount of signal light attenuation caused by the variable optical attenuator and the external attenuating medium, by means of a front optical detection section of a front optical amplification block provided before the variable optical attenuator and the external attenuating medium and a back optical detection section of a back optical amplification block provided after the variable optical attenuator and the external attenuating medium; an attenuation amount control section for controlling the variable optical attenuator to keep the amount of signal light attenuation constant; and a connection detection section for detecting a connection or disconnection of the external attenuating medium in accordance with the amount of signal light attenuation obtained when the amount of attenuation caused by the variable optical attenuator is minimized.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIGS. 9A and 9B show the operation of the optical amplifier.

FIGS. 12A and 12B show the operation of the optical amplifier.

DESCRIPTION OF THE PREFERRED EMBODIMENTS

The principle of the present invention will be described in detail with reference to drawings.

Figure 1:
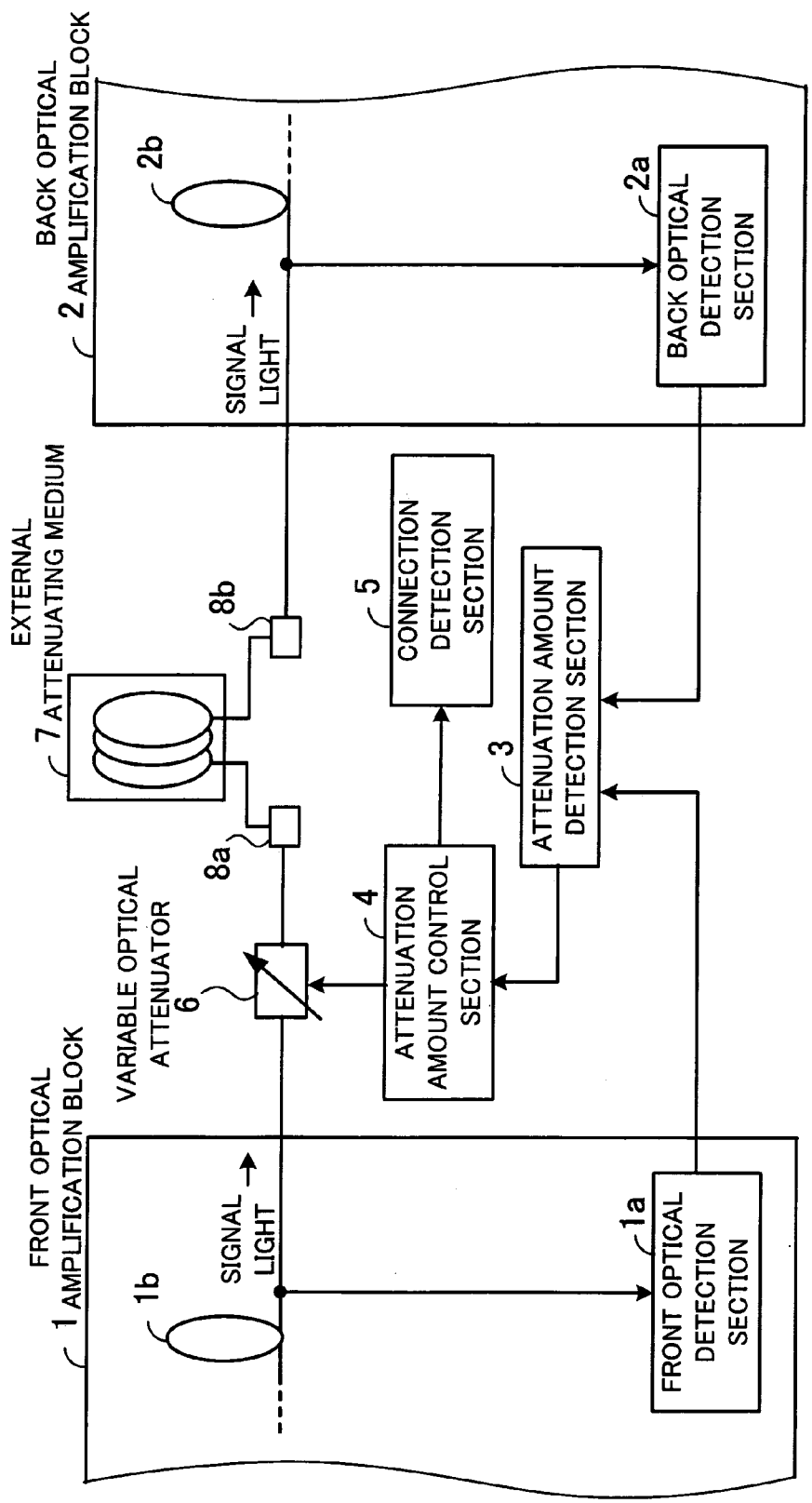
FIG. 1 is a view showing an overview of an optical amplifier.

FIG. 1 is a view showing an overview of an optical amplifier. As shown in the figure, the optical amplifier includes a front optical amplification block 1, a back optical amplification block 2, an attenuation amount detection section 3, an attenuation amount control section 4, a connection detection section 5, a variable optical attenuator 6, and an external attenuating medium 7, which is a DCF, for instance, connected to terminals 8*a* and 8*b*.

The front optical amplification block 1 includes an EDF 1*b* for amplifying signal light and a front optical detection section 1*a* for monitoring the gain of the EDF 1*b* in an output stage.

The back optical amplification block 2 includes an EDF 2*b* for amplifying signal light and a back optical detection section 2*a* for monitoring the gain of the EDF 2*b* in an input stage.

The attenuation amount detection section 3 detects the amount of signal light attenuation caused by the variable optical attenuator 6 and the external attenuating medium 7, by means of the front optical detection section 1*a* of the front optical amplification block 1 provided before the variable optical attenuator 6 and the external attenuating medium 7 connected in series and the back optical detection section 2*a* of the back optical amplification block 2 provided after the variable optical attenuator 6 and the external attenuating medium 7.

The attenuation amount control section 4 controls the variable optical attenuator 6 so that the attenuation amount detection section 3 detects a constant amount of signal light attenuation caused by the variable optical attenuator 6 and the external attenuating medium 7.

The connection detection section 5 detects a connection or disconnection of the external attenuating medium 7 in accordance with the amount of signal light attenuation obtained when the attenuation amount of the variable optical attenuator 6 is minimized.

When the external attenuating medium 7 is disconnected from the terminal 8*a* or 8*b*, the amount of attenuation detected by the front optical detection section 1*a* and the back optical detection section 2*a* increases. The attenuation amount control section 4 controls the variable optical attenuator 6 and decreases the amount of attenuation by the variable optical attenuator 6 to keep the amount of signal light attenuation by the variable optical attenuator 6 and the external attenuating medium 7 constant. Because the external attenuating medium 7 is disconnected, the amount of attenuation by the variable optical attenuator 6 is reduced to the minimum value. If the amount of signal light attenuation by the variable optical attenuator 6 and the external attenuating medium 7 exceeds a certain threshold while the attenuation amount of the variable optical attenuator 6 is minimized, the connection detection section 5 determines that the external attenuating medium 7 is disconnected. If the amount of signal light attenuation by the variable optical attenuator 6 with the minimum amount of attenuation and the external attenuating medium 7 falls below the certain threshold, the connection of the external attenuating medium 7 is detected.

The variable optical attenuator 6 has a lower limit of attenuation amount, below which the amount of attenuation cannot be reduced. Accordingly, the amount of attenuation by the external attenuating medium 7 can be recognized by the front optical detection section 1*a* of the front optical amplification block 1 and the back optical detection section 2*a* of the back optical amplification block 2, without providing any optical detection section before or after the external attenuating medium 7. In other words, a disconnection or connection of the external attenuating medium 7 can be detected in accordance with the amount of attenuation before and after the external attenuating medium 7, without any optical detection section before or after the external attenuating medium 7, SN degradation can be avoided, and the power consumption can be reduced.

A first embodiment of the present invention will be described in detail with reference to drawings.

Figure 2:
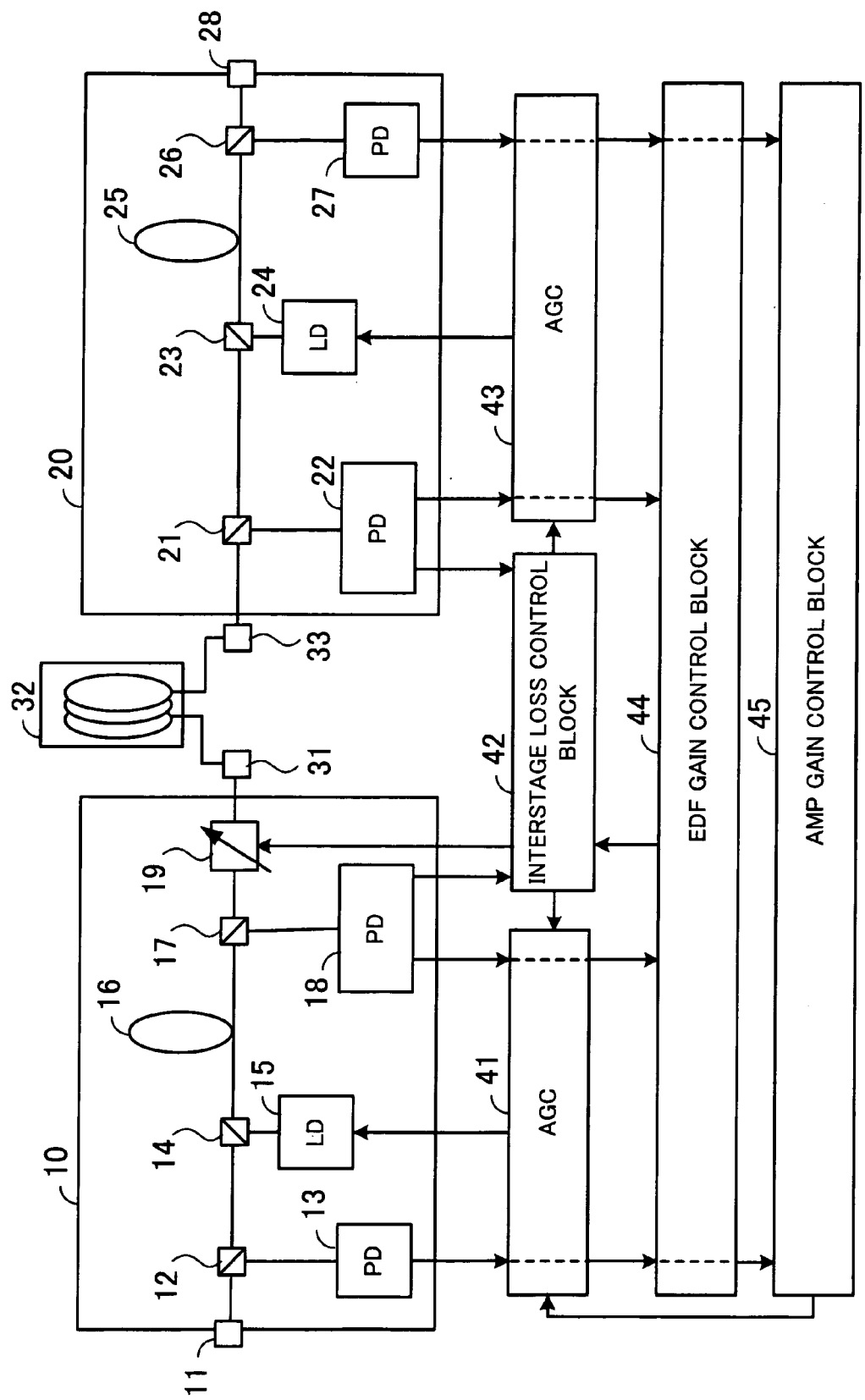
FIG. 2 is a block diagram of an optical amplifier of a first embodiment.

FIG. 2 is a block diagram of an optical amplifier of the first embodiment. As shown in the figure, the optical amplifier includes a front optical amplification block 10, a back optical amplification block 20, a DCF 32 connected to terminals 31 and 33, automatic gain controllers (AGCS) 41 and 43, an interstage loss control block 42, an EDF gain control block 44, and an AMP gain control block 45. The front optical amplification block 10 includes an input terminal 11, couplers 12, 14, and 17, PDs 13 and 18, an LD 15, an EDF 16, and a VOA 19. The back optical amplification block 20 includes couplers 21, 23, and 26, PDs 22 and 27, an LD 24, an EDF 25, and an output terminal 28.

The input terminal 11 of the front optical amplification block 10 receives wavelength division multiplexing (WDM) signal light, for instance. The signal light input to the input terminal 11 passes the couplers 12 and 14 and is output to the EDF 16. A part of the signal light input to the input terminal 11 is branched to the PD 13 by the coupler 12. The PD 13 converts the power (optical intensity) of the input light to an electric signal and outputs the signal to the AGC 41, the EDF gain control block 44, and the AMP gain control block 45.

The LD 15 outputs pumped light as controlled by the AGC 41. The coupler 14 combines the pumped light output from the LD 15 with the signal light input from the input terminal 11 and outputs the combined light to the EDF 16. Now, the signal light has a gain depending on the power of the pumped light.

A part of the signal light output from the EDF 16 is branched to the PD 18 by the coupler 17. The PD 18 converts the power of the input light to an electric signal and outputs the signal to the AGC 41, the interstage loss control block 42, and the EDF gain control block 44. The EDF 16 also outputs the signal light to the VOA 19. The VOA 19 attenuates the input signal light as controlled by the interstage loss control block 42 and outputs the light to the terminal 31.

The DCF 32 is connected to the terminals 31 and 33 and compensates for wavelength dispersion of the signal light output from the front optical amplification block 10. The DCF 32 can be replaced by the user, and a DCF satisfying the user requirements is connected to the terminals 31 and 33.

A part of the signal light output from the DCF 32 is branched to the PD 22 by the coupler 21 of the back optical amplification block 20. The PD 22 converts the power of the input light to an electric signal and outputs the signal to the interstage loss control block 42, the AGC 43, and the EDF gain control block 44. The DCF 32 also outputs the signal light through the couplers 21 and 23 to the EDF 25.

The LD 24 outputs pumped light as controlled by the AGC 43. The coupler 23 combines the pumped light output from the LD 24 with the signal light and outputs the combined light to the EDF 25. Now, the signal light has a gain depending on the power of the pumped light.

A part of the signal light output from the EDF 25 is branched to the PD 27 by the coupler 26. The PD 27 converts the power of the input light to an electric signal and outputs the signal to the AGC 43, the EDF gain control block 44, and the AMP gain control block 45. The EDF 25 also outputs the signal light to the output terminal 28.

The AGC 41 controls the pumped light of the LD 15 with reference to the electric signals representing the power of light, output from the PD 13 and the PD 18, so that the gain of the EDF 16 becomes a target value G1. The target value G1 is calculated by the AMP gain control block 45.

The interstage loss control block 42 controls the VOA 19 with reference to electric signals representing the power of light output from the PD 18 of the front optical amplification block 10 and the PD 22 of the back optical amplification block 20, so that the amount of loss by the VOA 19 and the DCF 32 becomes a target value L1. The target value L1 is calculated by the EDF gain control block 44. The interstage loss control block 42 also detects a connection or disconnection in accordance with the electric signals representing the power of light output from the PD 18 and the PD 22. If a disconnection is detected, the interstage loss control block 42 controls the AGC 41 so that a safety level of signal light is output from the VOA 19 and turns off the AGC 43.

The AGC 43 controls the pumped light of the LD 24 with reference to the electric signals representing the power of light, output from the PD 22 and the PD 27 so that the gain of the EDF 25 becomes a target value G2. The target value G2 is a fixed value, and the AGC 43 performs control to bring the gain of the EDF 25 to the target value G2.

The EDF gain control block 44 obtains the target value L1 in accordance with the electric signals of the PD 13, the PD 18, the PD 22, and the PD 27 such that the total gain of the EDF 16 and the EDF 25 is kept constant. If the total gain of the EDF 16 and the EDF 25 changes, the waveform characteristics of the gain to the signal light would change. The VOA 19 absorbs the gain of the EDF 16 changed by the AGC 41. The target value L1 is given by expressions (1) and (2) below:

$$L1 = L1 - \Delta L1 \quad (1)$$

$$\Delta L1 = (PD18 - PD13) + (PD27 - PD22) - EDFfg \quad (2)$$

"PD18−PD13" of the expression (2) represents the gain of the EDF 16 calculated from the electric signals of the PD 18 and the PD 13. "PD27−PD22" represents the gain of the EDF 25 calculated from the electric signals of the PD 27 and the PD 22. The value of "PD27−PD22" is constant because the gain of the EDF 25 is kept constant by the AGC 43.

EDFfg (fg: flat gain) represents the total gain of the EDF 16 and the EDF 25, which must be kept constant, and the value is stored in memory in advance. Accordingly, ΔL1 represents a difference between the total gain of the EDF 16 and the EDF 25, which must be kept constant, and the actual gain. The difference obtained in the expression (2) is subtracted from the target value L1, and a new target value L1 is obtained in the expression (1).

The AMP gain control block 45 calculates the target value G1 in accordance with the electric signals of the PD 13 and the PD 27 so that the target level of light is obtained at the output terminal 28. The target value G1 used to control the AGC 41 is given by expressions (3) and (4) below:

$$G1 = G1 - \Delta G1 \quad (3)$$

$$\Delta G1 = (PD27 - PD13) - \text{target-AMP-gain} \quad (4)$$

"PD27−PD13" in the expression (4) represents a gain between the stage preceding the EDF 16 and the stage following the EDF 25. The target AMP gain represents a target gain of signal light required to obtain a constant target level of light at the output terminal 28. ΔG1 represents a difference between the actual gain and the target gain of signal light required to obtain the target level of light at the output terminal 28. The difference of the expression (4) is subtracted from the target value G1, and a new target value G1 is obtained in the expression (3).

The operation will be described with reference to FIG. 2: The operation performed when an interstage loss increases will be described first; the operation performed when signal light input to the input terminal 11 increases will be described next; the operation for detecting a disconnection without providing a PD before the DCF 32 will be described next; and the operation of safety optical level control and the operation to restore the connection will be described last. The first operation performed when an interstage loss increases will next be described.

Figure 3A:
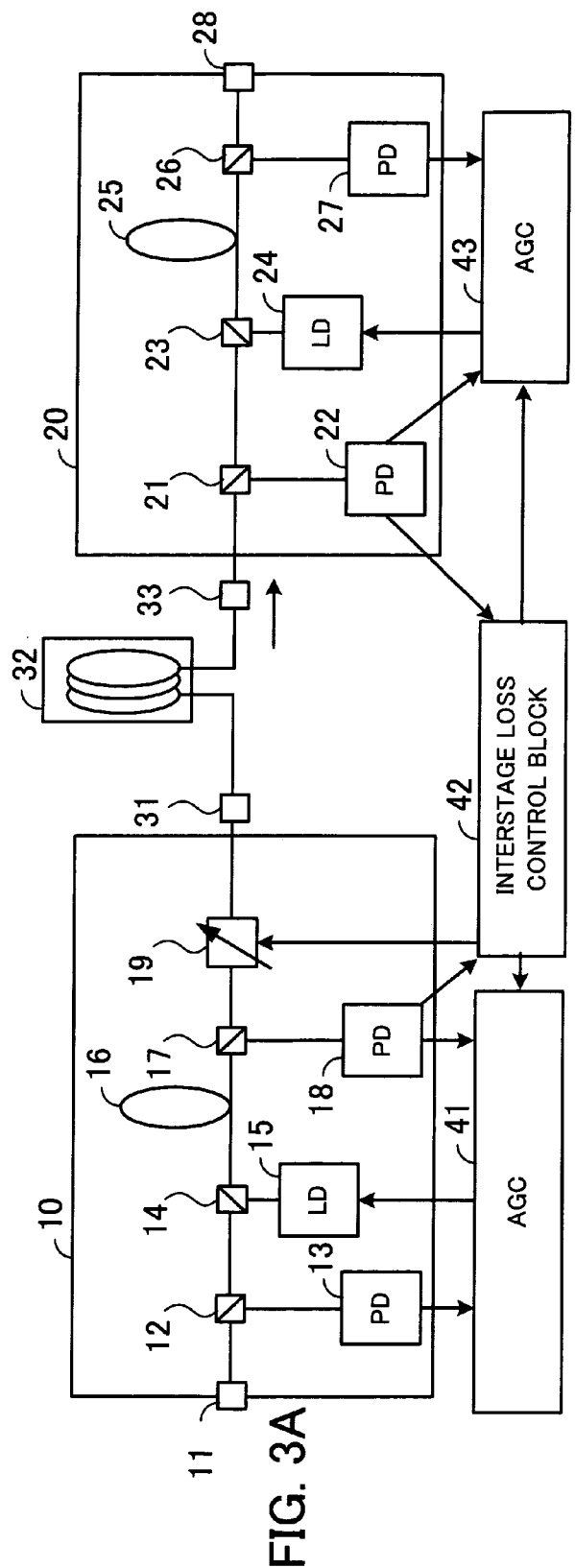
FIGS. 3A and 3B show the operation of the optical amplifier when an interstage loss increases.
Figure 3B:
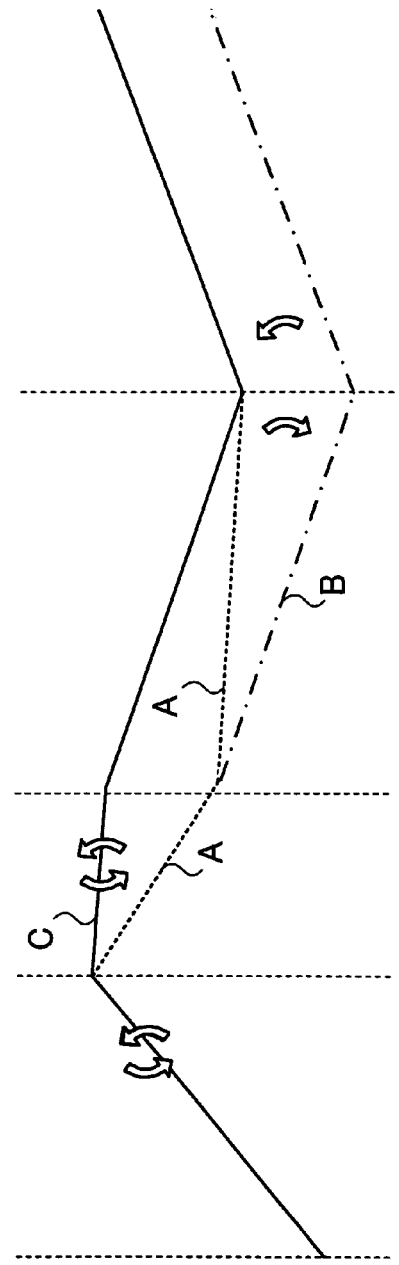

FIGS. 3A and 3B are views given to describe the operation of the optical amplifier when an interstage loss increases. FIG. 3A shows the optical amplifier shown in FIG. 2, omitting the EDF gain control block 44 and the AMP gain control block 45.

FIG. 3B shows the level of signal light varying in different stages of the optical amplifier shown in FIG. 3A. The height of waveforms in FIG. 3B represents the level of light, and vertical dotted lines are separators between different stages of the optical amplifier shown in FIG. 3A.

Suppose that the amount of loss by the VOA 19 and the amount of loss by the DCF 32 are initially stable as represented by waveform A and that the amount of loss by the DCF 32 increases as represented by waveform B.

The AMP gain control block 45 increases the target value G1 of the AGC 41 by the amount of loss caused by the DCF 32 so that the target level of signal light can be obtained at the output terminal 28.

The increase in target value G1 increases the gain of the EDF 16, and the total gain of the EDF 16 and the EDF 25 cannot be kept constant. The interstage loss control block 42 then reduces the amount of loss caused by the VOA 19 as represented by waveform C so that the gain of the EDF 16 can be reduced. In other words, to reduce the gain of the EDF 16, the amount of loss by the VOA 19 is reduced by the amount of reduction to be made in the gain of the EDF 16 to absorb the loss by the DCF 32.

If the interstage loss increases, the optical amplifier operates as described above to keep a constant amount of loss caused by the VOA 19 and the DCF 32. The gain of the EDF 16 and the EDF 25 is kept constant, and the target level of light is obtained at the output terminal 28. The AMP gain control block 45 and the interstage loss control block 42 repeat the calculation of the expressions (1) to (4) under PID control to obtain final target values G1 and L1 (it seems ultimately that just the amount of loss of the VOA 19 increases).

The operation performed when the signal light input to the input terminal 11 increases will be described next.

Figures 4A, 4B:
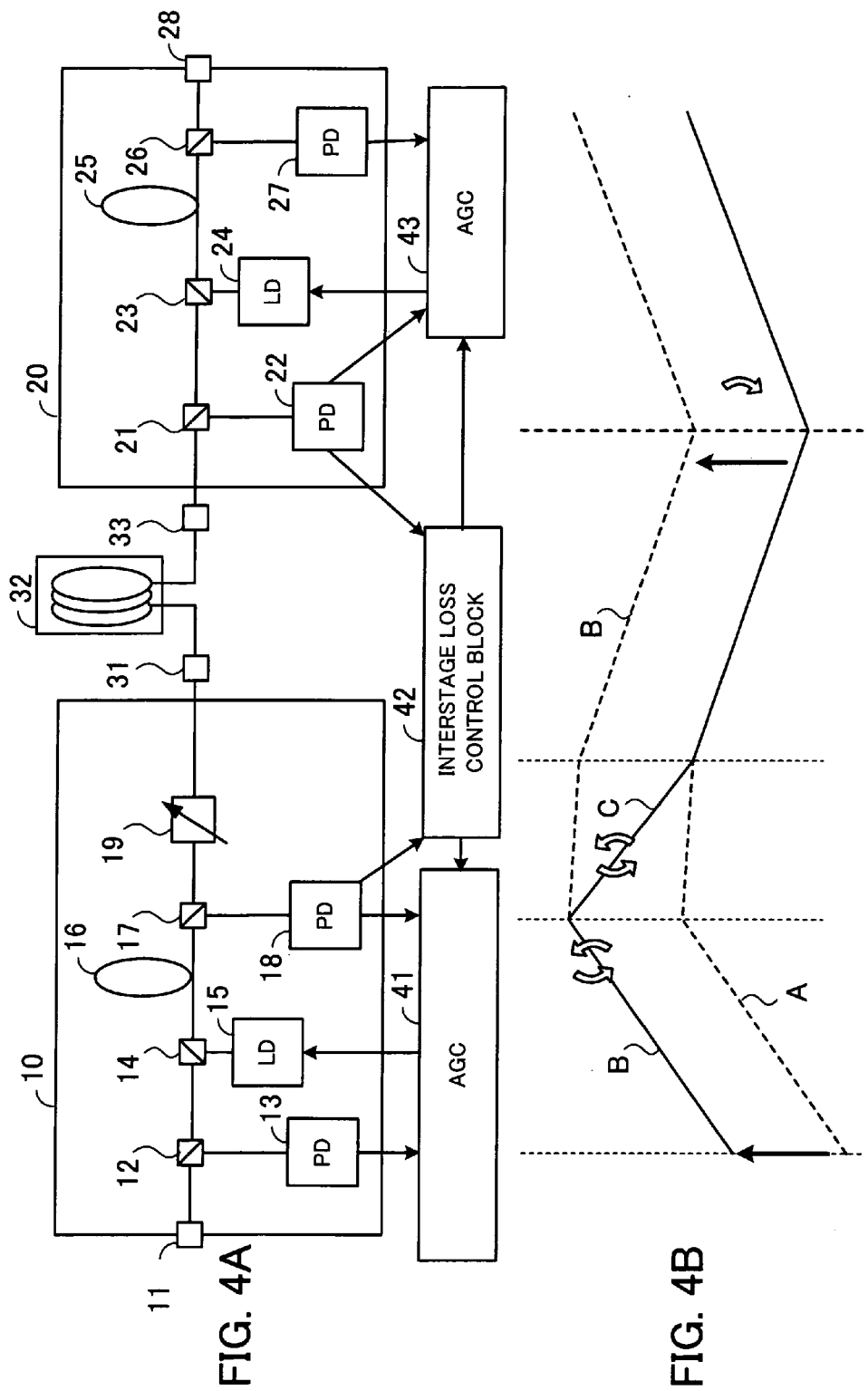
FIGS. 4A and 4B show the operation of the optical amplifier when signal light increases.

FIGS. 4A and 4B are views given to describe the operation of the optical amplifier when signal light increases. FIG. 4A shows the optical amplifier shown in FIG. 2, omitting the EDF gain control block 44 and the AMP gain control block 45.

FIG. 4B shows the level of signal light varying in different stages of the optical amplifier shown in FIG. 4A. The height of waveforms in FIG. 4B represents the level of light, and vertical dotted lines are separators between different stages of the optical amplifier shown in FIG. 4A.

Suppose that the level of signal light input to the input terminal 11 is as represented by waveform A and that the optical level per wave increases to increase the level of signal light input to the input terminal 11 as represented by waveform B.

The AMP gain control block 45 reduces the target value G1 of the AGC 41 so that the target level of signal light is kept at the output terminal 28.

The decrease in the target value G1 decreases the gain of the EDF 16, and the gain of the EDF 16 and the EDF 25 is not kept constant. The interstage loss control block 42 increases the amount of loss by the VOA 19 as represented by waveform C so that the gain of the EDF 16 can be increased. In other words, to increase the gain of the EDF 16, the amount of loss by the VOA 19 is increased by the amount of increase to be made in the gain of the EDF 16 to absorb the increase of the level of the input signal light.

If the optical level per wave increases in signal light, the optical amplifier keeps the amount of loss by the VOA 19 and the DCF 32 constant through the operation described above. The gain of the EDF 16 and EDF 25 is kept constant, and the target level of light is obtained at the output terminal 28. The AMP gain control block 45 and the interstage loss control block 42 repeat the calculation of the expressions (1) to (4) to obtain the final target values G1 and L1.

The operation to detect a disconnection without using a PD before the DCF 32 will be described next.

Figure 5A:
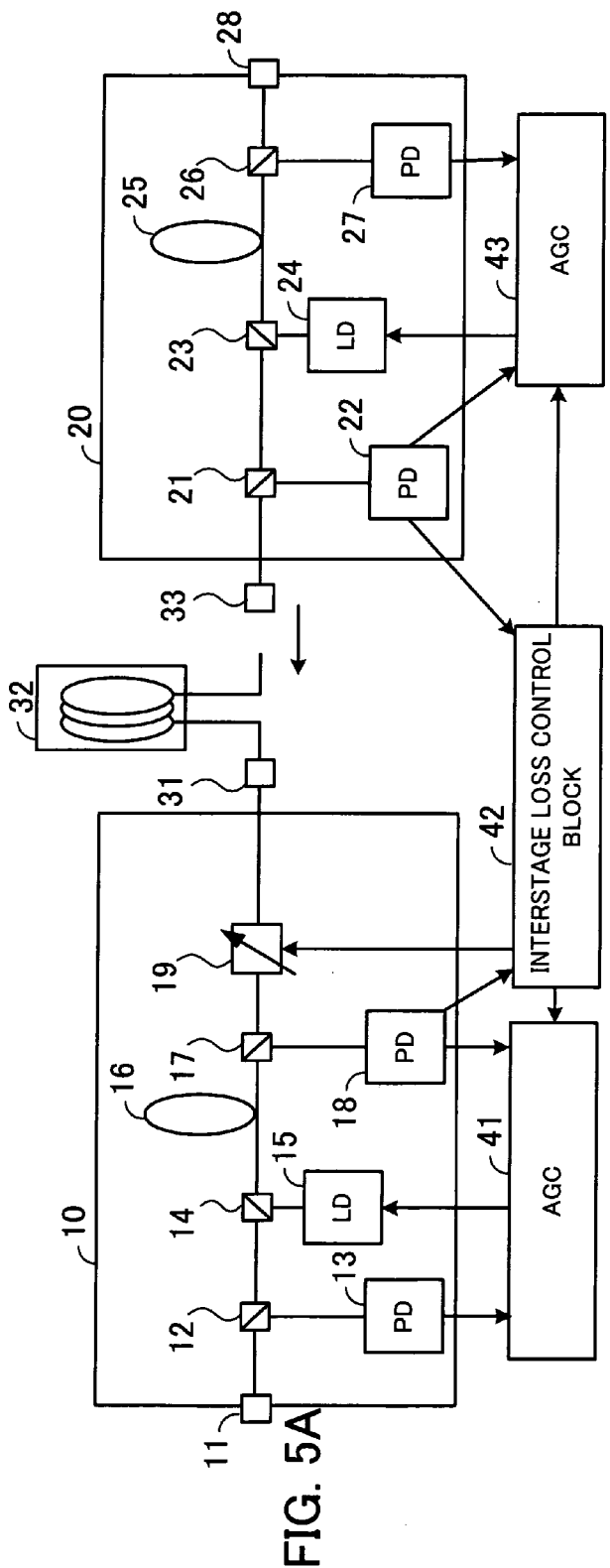
FIGS. 5A and 5B show the operation of the optical amplifier in which a disconnection is detected.
Figure 5B:
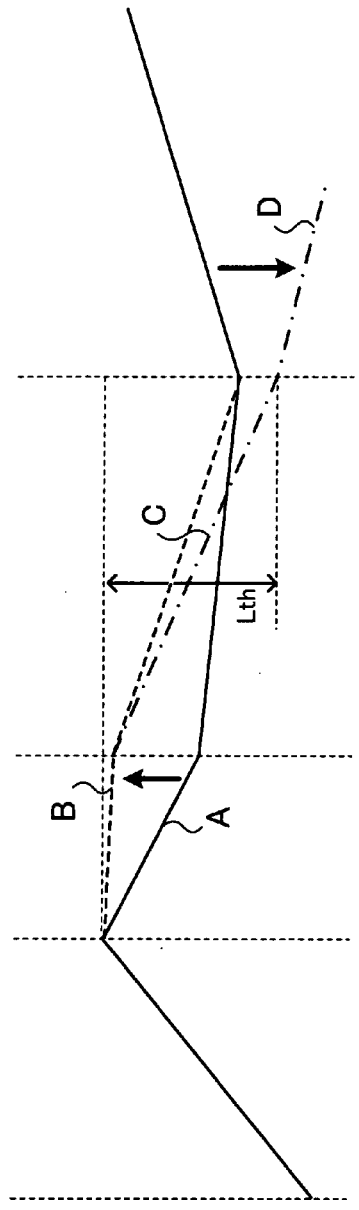

FIGS. 5A and 5B are views given to describe the operation of the optical amplifier to detect a disconnection. FIG. 5A shows the optical amplifier shown in FIG. 2, omitting the EDF gain control block 44 and the AMP gain control block 45.

FIG. 5B shows the level of signal light varying in different stages of the optical amplifier shown in FIG. 5A. The height of waveforms in FIG. 5B represents the level of light, and vertical dotted lines are separators between different stages of the optical amplifier shown in FIG. 5A.

Suppose that signal light is input to the optical amplifier and the level of signal light is stable as represented by waveform A. When the DCF 32 comes off from the terminal 33, the amount of loss by the DCF 32 increases, and the interstage loss control block 42 decreases the amount of loss by the VOA 19 so that the total amount of loss caused by the DCF 32 and the VOA 19 is kept constant. Because the DCF 32 is disconnected from the terminal 33, the amount of loss by the VOA 19 continues decreasing as indicated by an upward arrow in the figure, and the interstage loss control block 42 finally opens the VOA 19 (minimizes the amount of loss caused by the VOA 19) as represented by waveform B.

The amount of loss caused by the DCF 32, disconnected from the terminal 33, is large as represented by waveform C, and the power of light detected by the PD 22 becomes small even if the VOA 19 is open. As a result, the amount of loss caused by the open VOA 19 and the DCF 32 exceeds a threshold, and the interstage loss control block 42 detects a disconnection (of the DCF 32). The threshold is given by expression (5) below:

$$Lth = Ldm + Lvdl + Lm \quad (5)$$

where, Lth represents the threshold at which a disconnection is detected; Ldm represents the maximum allowable value of loss in the stage between the terminals 31 and 33 or the maximum value of loss which DCF, an external attenuating medium, allows for; Lvdl is the value of loss when the VOA 19 is open, that is, when the amount of attenuation by the VOA 19 is minimized; and Lm is a disconnection detection margin. The interstage loss control block 42 outputs a control signal to the VOA 19 and can determine that the VOA 19 is open. When the voltage controlling the VOA 19 reaches the level at which the VOA 19 opens, the interstage loss control block 42 recognizes that the VOA 19 is open. The amount of loss by the open VOA 19 can be known beforehand in the design phase and the like and is stored in memory. The values of Ldm and Lm are also determined in advance as requirements and stored in memory.

The amount of loss produced when the DCF 32 is connected can be detected from the PD 18 and the PD 22. This is because the loss of the open VOA 19 is constant. Accordingly, a disconnection can be detected from the amount of loss before and after the DCF 32, without providing a PD before the DCF 32. When a disconnection is detected, the interstage loss control block 42 turns off the AGC 43 to reduce the gain of the EDF 25 as represented by waveform D. In the example shown in FIGS. 5A and 5B, the target value G1 of the AGC 41 would increase if the AMP gain control block 45 operates to keep the level of light constant at the output terminal 28, as given by the expressions (3) and (4). Therefore, when a disconnection is detected, the operation of the AMP gain control block 45 is stopped to make the AGC 41 stop updating the target value G1, preventing the output level at the terminal 33 from increasing.

If the AMP gain is changed by a single VOA 19 as shown in FIGS. 2 and 5, the VOA 19 would have a margin for reducing the loss further when the interstage loss is maximized. In this case, the VOA 19 opens accordingly (to reduce the loss), and the threshold at which a disconnection is detected varies with the AMP gain. The threshold is given by expression (6) below:

$$Lth = Ldm + Lvdl + Lm - (\text{AMP-gain} - \text{maximum-AMP-gain}) \quad (6)$$

where, AMP-gain is the current AMP gain, or a gain between the stage preceding the EDF 16 and the stage following the EDF 25; and maximum-AMP-gain is the maximum gain of the optical amplifier, or an AMP gain when the VOA 19 is widest open to provide Lvdl.

The operation of safety optical level control and the operation to restore a connection without using a PD before the DCF 32 will be described next.

To restore a connection is to connect the external attenuating medium again between the front optical amplifier block and the back optical amplifier block.

Figure 6A:
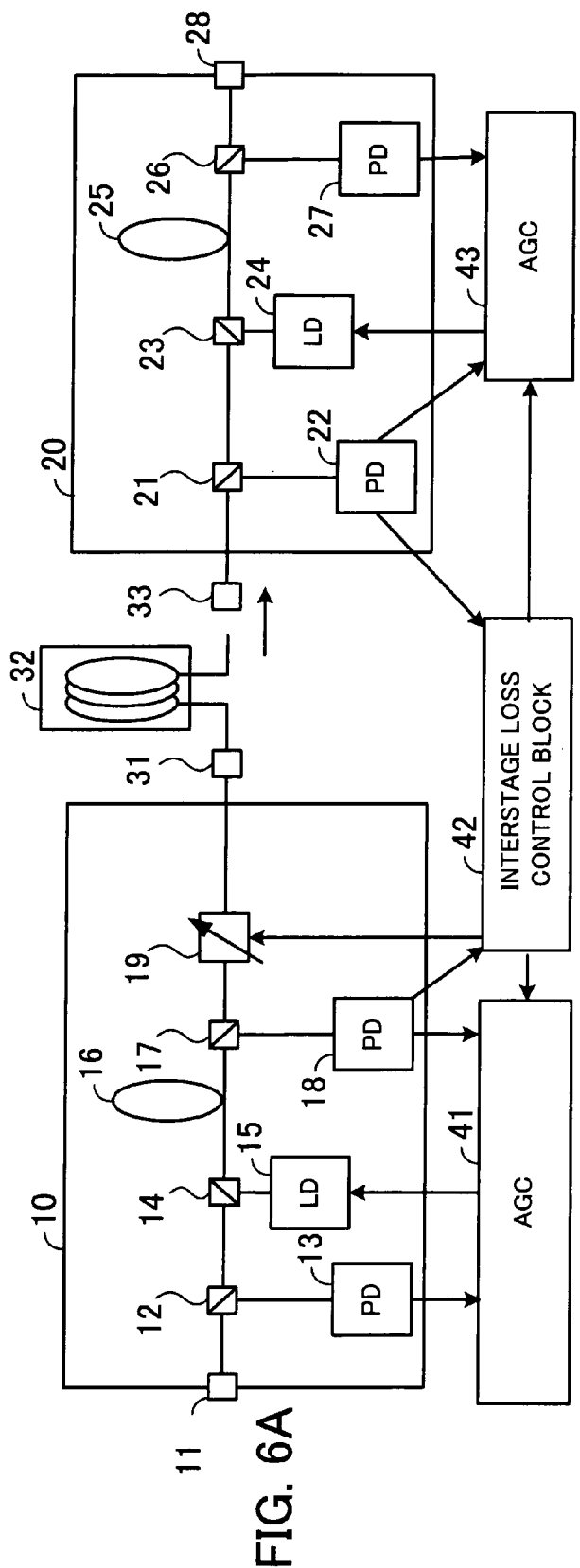
FIGS. 6A and 6B show the operation of the optical amplifier in which safety optical level control is performed and a connection is restored.
Figure 6B:
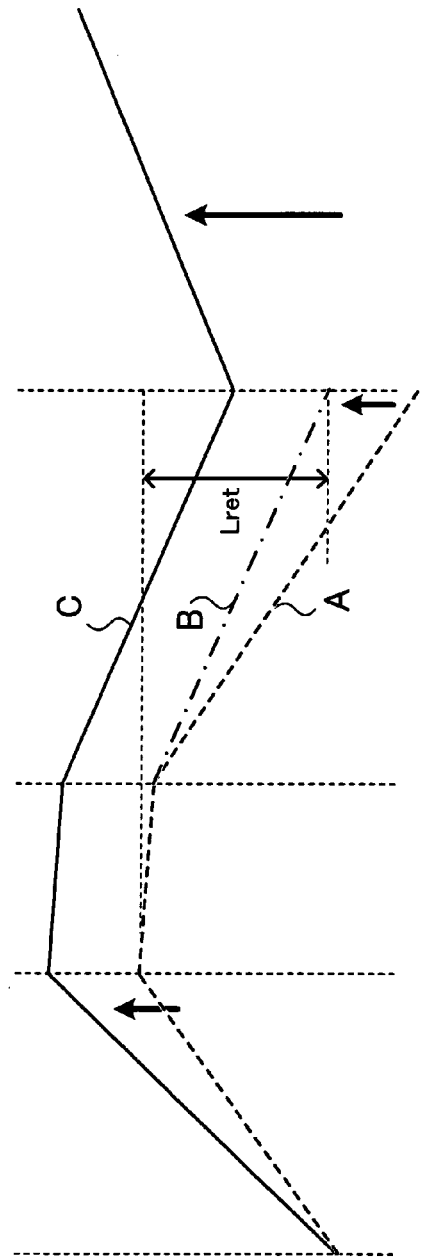

FIGS. 6A and 6B are views given to describe the operation of safety optical level control and the operation of the optical amplifier to restore a connection. FIG. 6A shows the optical amplifier shown in FIG. 2, omitting the EDF gain control block 44 and the AMP gain control block 45.

FIG. 6B shows the level of signal light varying in different stages of the optical amplifier shown in FIG. 6A. The height of waveforms in FIG. 6B represents the level of light, and vertical dotted lines are separators between different stages of the optical amplifier shown in FIG. 6A.

When a disconnection is detected, the interstage loss control block 42 performs safety optical level control so that a great level of light is not output to the stage (terminal 31) preceding the user-detachable DCF 32. More specifically, the PD 18 monitors the level of light before the VOA 19, and the AGC 41 controls the gain of the EDF 16 so that a safety level of light is obtained at the terminal 31.

When a disconnection is detected, the VOA 19 is open, and the interstage loss control block 42 determines the level of light that should be detected by the PD 18 by using the amount of loss by the open VOA 19 stored in memory. The level of light that should be detected by the PD 18 to ensure a safety level of signal light before the DCF 32 is given by expression (7) below.

$$PDs = Psafe + Lvdl \quad (7)$$

where, PDs represents the level of light that should be detected by the PD 18; Psafe represents a safety level of light that should be output from the VOA 19; and Lvdl represents the amount of loss obtained when the VOA 19 is open. When a disconnection is detected, the interstage loss control block 42 controls the AGC 41 so that the level of light meeting the expression (7) is detected by the PD 18. The value of Psafe is stored in memory in advance.

The operation to restore a connection will be, described next.

Suppose that the interstage loss control block 42 shown in FIG. 6 detects a disconnection and controls the AGC 41 so that a safety level of light is obtained before the DCF 32, as represented by waveform A. When the connection is restored (the DCF 32 is connected to the terminals 31 and 33), the amount of loss across the DCF 32 decreases. The interstage loss control block 42 monitors the amount of loss caused by the VOA 19 and the DCF 32 by means of the PD 18 and the PD 22 and recognizes that the connection is restored when the amount of loss falls below a restoration threshold. The restoration threshold is given by expression (8) below:

$$Lret = Ldm + Lvdl - Lm \quad (8)$$

where, Lret represents the restoration threshold at which the restoration of a connection is detected; Ldm represents the maximum allowable value of loss between the terminals 31 and 33; Lvdl represents the value of loss when the VOA 19 is open; and Lm represents a connection restoration detection margin. These values are stored in memory in advance.

When the connection of the DCF 32 is restored and when the amount of loss caused by the VOA 19 and the DCF 32 falls below the restoration threshold Lret, as represented by waveform B, the interstage loss control block 42 recognizes that the connection is restored. The interstage loss control block 42 stops the safety optical level control of the AGC 41, enabling usual gain control of the EDF 16, and starts the operation of the AGC 43 again. Signal light is amplified as represented by waveform C and is output from the output terminal 28 at a desired level.

The amount of loss by the DCF 32 can be detected by the PD 18 and the PD 22 because the loss is constant when the VOA 19 is open. Accordingly, the restoration of the connection can be detected in accordance with an accurate amount of loss caused by the DCF 32, without providing a PD before the DCF 32.

When the VOA is open, the amount of loss varies little with temperature. Accordingly, a disconnection or a restored connection can be detected in accordance with the accurate amount of loss caused by the DCF.

Figure 7:
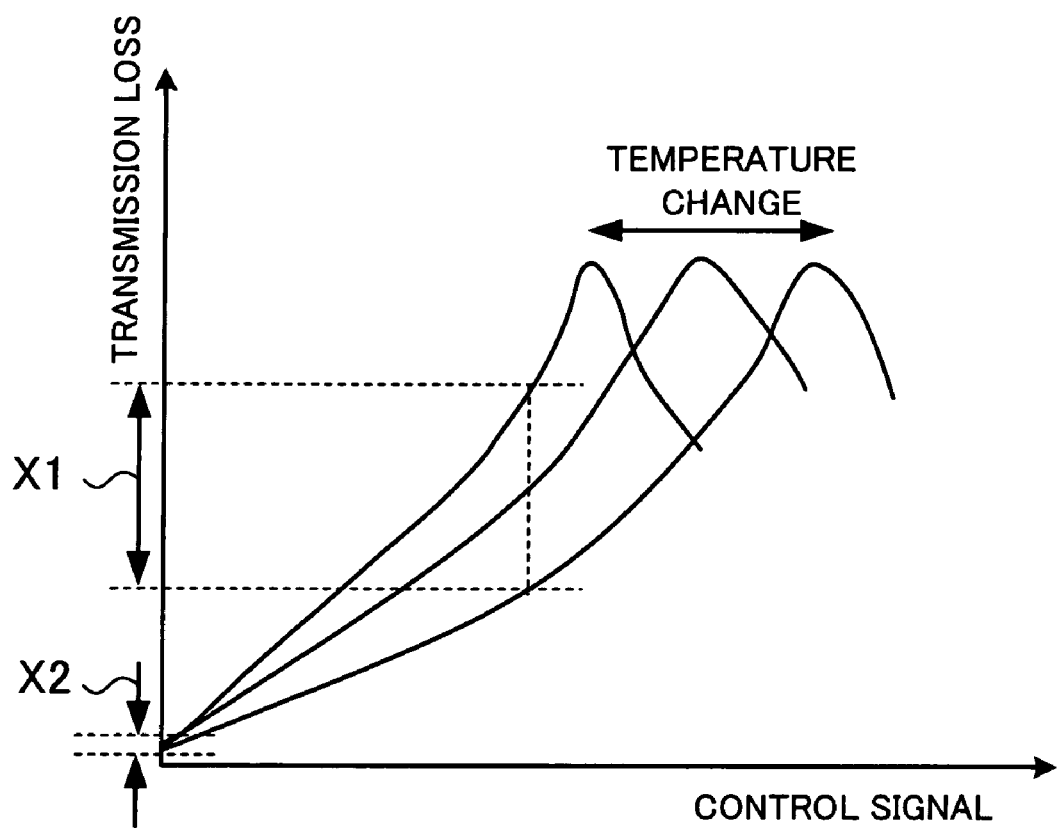
FIG. 7 shows a VOA varying with temperature.

FIG. 7 shows the VOA varying with temperature. The horizontal axis of the graph represents a control signal for controlling the amount of loss by the VOA, and the vertical axis represents the transmission loss of the VOA. As shown in the figure, the transmission loss varies with temperature even if the value of the control signal is the same.

An arrow X1 represents that the transmission loss widely varies with temperature at a great distance from the open VOA. An arrow X2 represents that the transmission loss varies a little with temperature when the VOA is open. Because the loss varies a little with temperature when the VOA is open, a connection and disconnection can be detected from the accurate amount of loss caused by the DCF.

Accordingly, a connection and disconnection of the DCF 32 can be detected from the amount of attenuation by the DCF 32, by means of the PD 18 of the front optical amplification block 10 and the PD 22 of the back optical amplification block 20, without providing a PD before the DCF 32. Therefore, SN degradation can be avoided, and the power consumption can be reduced.

Because no PD is required before the DCF 32, the cost can be reduced.

The restoration of the connection is determined from the interstage loss when the VOA 19 is open, so that the optical amplifier will not be frozen without attaining the target value. If the restoration of the connection is recognized just by monitoring the loss caused by the DCF 32 without opening the VOA 19, the target value might not be attained because of a monitoring error even when the VOA is fully open. The optical amplifier shown in FIG. 2 detects the restoration of connection in accordance with the value of loss caused by the DCF, by means of the PD 18 and the PD 22 while the VOA 19 is open. Because the VOA is open while the limit value is known, the optical amplifier will not be frozen without attaining the target value.

A second embodiment of the present invention will be described in detail with reference to drawings. Whereas the first embodiment uses a VOA connected in series with a DCF to absorb the dynamic range, the second embodiment provides another VOA to absorb the dynamic range.

Figure 8:
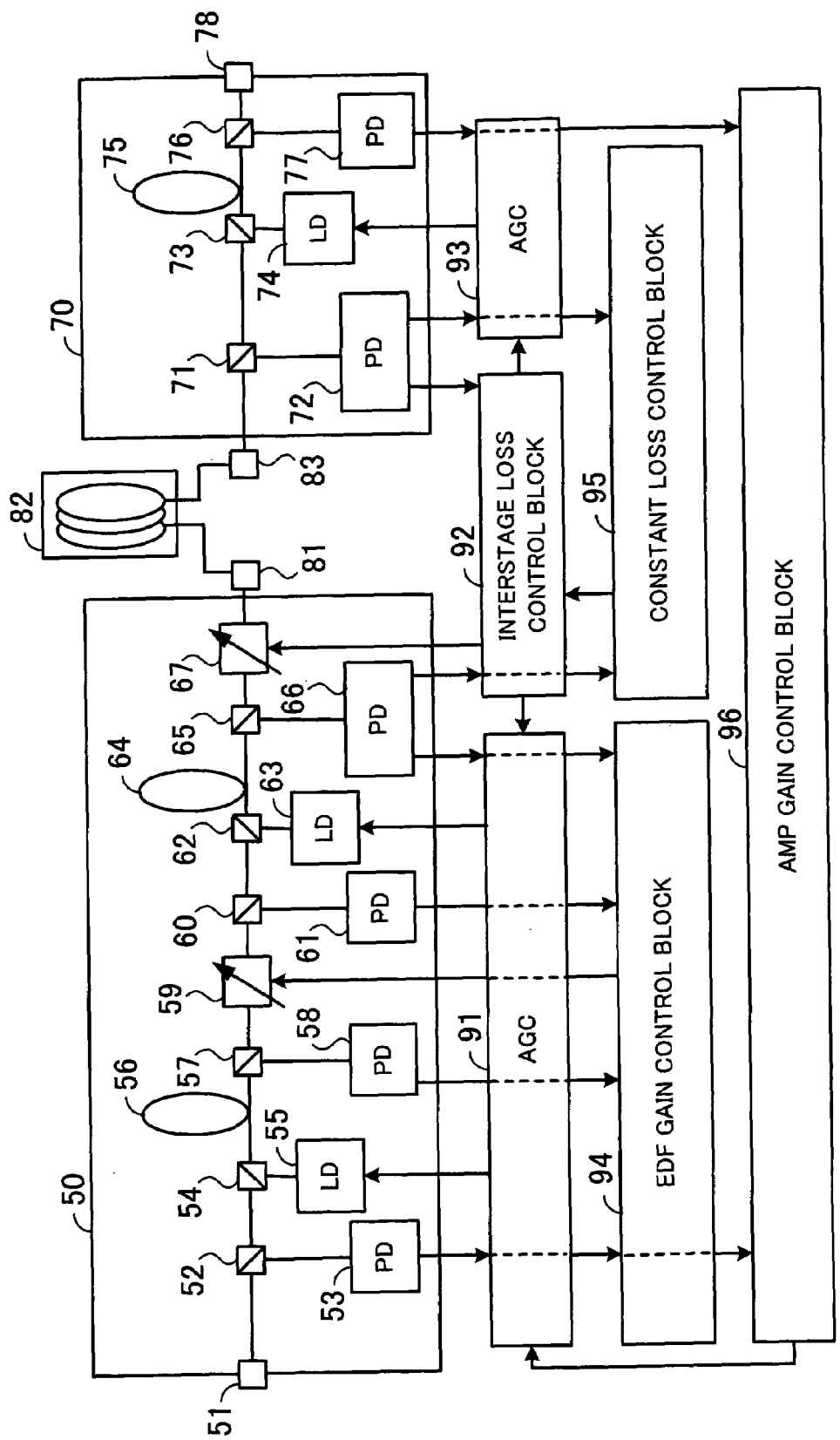
FIG. 8 is a block diagram of an optical amplifier of a second embodiment.

FIG. 8 is a block diagram of an optical amplifier of the second embodiment. As shown in the figure, the optical amplifier includes a front optical amplification block 50, a back optical amplification block 70, a DCF 82 connected to terminals 81 and 83, AGCs 91 and 93, an interstage loss control block 92, an EDF gain control block 94, a constant loss control block 95, and an AMP gain control block 96. The front optical amplification block 50 includes an input terminal 51, couplers 52, 54, 57, 60, 62, and 65, PDs 53, 58, 61, and 66, LDs 55 and 63, EDFs 56 and 64, and VOAs 59 and 67. The back optical amplification block 70 includes couplers 71, 73, and 76, PDs 72 and 77, an LD 74, an EDF 75, and an output terminal 78.

The input terminal 51 of the front optical amplification block 50 receives a WDM signal light, for instance. The signal light input to the input terminal 51 is output through the couplers 52 and 54 to the EDF 56. The signal input to the input terminal 51 is also branched off to the PD 53 by the coupler 52. The PD 53 converts the power of the input light to an electric signal and outputs the signal to the AGC 91, the EDF gain control block 94, and the AMP gain control block 96.

The LD 55 outputs pumped light as controlled by the AGC 91. The coupler 54 combines the pumped light output from the LD 55 with the signal light and outputs the combined light to the EDF 56. Now, the signal light has a gain depending on the power of the pumped light.

The signal light output from the EDF 56 is branched off to the PD 58 by the coupler 57. The PD 58 converts the power of input light to an electric signal and outputs the signal to the EDF gain control block 94. The signal light from the EDF 56 is also output to the VOA 59. The VOA 59 attenuates the input signal light as controlled by the EDF gain control block 94, and outputs the attenuated light to the coupler 60.

The PD 61 converts the power of signal light output from the VOA 59 to an electric signal and outputs the signal to the EDF gain control block 94.

The LD 63 outputs pumped light as controlled by the AGC 91. The coupler 62 combines the pumped light output from the LD 63 with the signal light and outputs the combined light to the EDF 64. Now, the signal light has a gain depending on the power of the pumped light.

The signal light output from the EDF 64 is branched off to the PD 66 by the coupler 65. The PD 66 converts the power of the input light to an electric signal and outputs the signal to the AGC 91, the interstage loss control block 92, the EDF gain control block 94, and the constant loss control block 95. The signal light is also output from the EDF 64 to the VOA 67. The VOA 67 attenuates the input signal light as controlled by the interstage loss control block 92 and outputs the attenuated light to the terminal 81.

The DCF 82 is connected to the terminals 81 and 83 and compensates for wavelength dispersion of the signal light output from the front optical amplification block 50. The DCF 82 can be replaced by the user, and a DCF satisfying the user requirements is connected to the terminals 81 and 83.

The signal light output from the DCF 82 is branched off to the PD 72 by the coupler 71 of the back optical amplification block 70. The PD 72 converts the power of the input light to an electric signal and outputs the signal to the interstage loss control block 92, the AGC 93, and the constant loss control block 95. The signal light output from the DCF 82 is also output through the couplers 71 and 73 to the EDF 75.

The LD 74 outputs pumped light as controlled by the AGC 93. The coupler 73 combines the pumped light output from the LD 74 with the signal light and outputs the combined light to the EDF 75. Now, the signal light has a gain depending on the power of the pumped light.

The signal light output from the EDF 75 is branched off to the PD 77 by the coupler 76. The PD 77 converts the power of the input light to an electric signal and outputs the signal to the AGC 93 and the AMP gain control block 96. The signal light output from the EDF 75 is also output to the output terminal 78.

The AGC 91 controls the pumped light of the LD 55 and the LD 63 with reference to the electric signals output from the PD 53 and the PD 66 so that the gain between the stage preceding the EDF 56 and the stage following the EDF 64 becomes a target value G1. The target value G1 is calculated by the AMP gain control block 96.

The interstage loss control block 92 performs control to bring the amount of loss caused by the VOA 67 and the DCF 82 to a target value L2, with reference to the electric signals output from the PD 66 and the PD 72. The target value L2 is calculated by the constant loss control block 95. The interstage loss control block 92 detects a connection or disconnection in accordance with the electric signals output from the PD 66 and the PD 72. When a disconnection is detected, the AGC 91 is controlled so that a safety level of signal light is output from the VOA 67, and the AGC 93 is turned off.

The AGC 93 controls the pumped light of the LD 74 with reference to the electric signals output from the PD 72 and the PD 77 so that the gain of the EDF 75 becomes a target value G2. The target value G2 is a fixed value, and the AGC 93 performs control to keep the gain of the EDF 75 to G2 always.

The EDF gain control block 94 calculates a target value L1 with which the VOA 59 is controlled to keep the total gain of the EDF 56 and the EDF 64 constant, in accordance with the electric signals of the PD 53, the PD 58, the PD 61, and the PD 66. If the total gain of the EDF 56 and the EDF 64 changes, the waveform characteristics of the signal light would change. The VOA 59 absorbs the gain of the EDF 56 and the EDF 64 varied by the AGC 91. The target value L1 of the VOA is given by expressions (9) and (10) below:

$$L1 = L1 - \Delta L1 \quad (9)$$

$$\Delta L1 = (PD58 - PD53) + (PD66 - PD61) - EDFfg \quad (10)$$

"PD58−PD53" of the expression (10) represents the gain of the EDF 56 calculated from the electric signals of the PD 58 and the PD 53. "PD66−PD61" represents the gain of the EDF 64 calculated from the electric signals of the PD 66 and the PD 61. EDFfg is the total gain of the EDF 56 and the EDF 64, which must be kept constant, and is stored in memory in advance. $\Delta L1$ represents a difference between the total gain of the EDF 56 and the EDF 64, which must be kept constant, and the actual gain. The difference of the expression (10) is subtracted from the target value L1, and a new target value L1 is obtained, as given by the expression (9).

The constant loss control block 95 calculates a target value L2 from the electric signals of the PD 66 and the PD 72 such that the amount of loss caused by the VOA 67 and the DCF 82 becomes constant. The calculated target value L2 is output to the interstage loss control block 92. The target value L2 is given by expression (11) below:

$$L2 = Ldm + Lvdl \quad (11)$$

where, Ldm represents the maximum allowable value of loss in the stage between the terminals 81 and 83; and Lvdl represents the value of loss produced when the VOA 67 is open. The VOA 67 can sufficiently absorb changes in the loss caused by the DCF 82 by setting the target value L2 to the sum of the maximum allowable loss of the stage and the value of loss produced when the VOA 67 is open.

The AMP gain control block 96 controls the AGC 91 in accordance with the electric signals of the PD 53 and the PD 77 such that a target level of light is kept at the output terminal 78. The target value G1 with which the AGC 91 is controlled is given by expressions (12) and (13) below:

$$G1 = G1 - \Delta G1 \quad (12)$$

$$\Delta G1 = (PD77 - PD53) - \text{target-AMP-gain} \quad (13)$$

"PD77−PD53" in the expression (12) represents the gain between the stage preceding the EDF 56 and the stage following the EDF 75. The signal light must obtain the target AMP gain so that the target level of light is obtained at the output terminal 78. $\Delta G1$ represents a difference between the actual gain and the target gain of the signal light for obtaining the target level of light at the output terminal 78. The difference given by the expression (13) is subtracted from the target value G1, and a new target value G1 is obtained.

The operation of the optical amplifier shown in FIG. 8 will next be described.

FIGS. 9A and 9B are views given to describe the operation of the optical amplifier. FIG. 9A shows the optical amplifier shown in FIG. 8, omitting the AGCs 91 and 93, the interstage loss control block 92, the EDF gain control block 94, the constant loss control block 95, and the AMP gain control block 96.

FIG. 9B shows the level of signal light varying in different stages of the optical amplifier shown in FIG. 9A. The height of waveforms in FIG. 9B represents the level of light, and vertical dotted lines are separators between different stages of the optical amplifier shown in FIG. 9A.

Suppose that the level of signal light input to the input terminal 51 is as represented by waveform A and that the optical level per wave increases to increase the level of signal light input to the input terminal 51 as represented by an upward arrow given in the figure.

The AMP gain control block 96 changes the gain of the EDF 56 and the EDF 64 so that the constant level of signal light is kept at the output terminal 78 as represented by waveform B. The amount of loss by the VOA 59 is also changed to keep the total gain of the EDF 56 and the EDF 64 constant.

If the amount of loss by the DCF 82 decreases as represented by a downward arrow given in the figure, the constant loss control block 95 increases the amount of loss caused by the VOA 67 so that the amount of loss by the VOA 67 and the DCF 82 is kept constant.

Accordingly, the optical amplifier operates in such a manner that the constant gain of the EDFs is kept and the target level of light is obtained at the output terminal 78.

The operation to detect a disconnection will next be described. When a disconnection occurs, the amount of loss by the DCF 82 increases. The constant loss control block 95 functions to keep a constant amount of loss, reducing the amount of loss by the VOA 67 and finally opening the VOA 67. When the amount of loss by the open VOA 67 and the DCF 82 exceeds a threshold, the interstage loss control block 92 recognizes that an interstage loss appears. The threshold of interstage loss is given by expression (14) below:

$$Lth = Ldm + Lvdl + Lm \quad (14)$$

where, Lth represents a threshold at which a disconnection is detected; Ldm represents the maximum allowable value of loss between the terminals 81 and 83; Lvdl represents the value of loss obtained when the VOA 67 is open; and Lm represents a disconnection detection margin.

The interstage loss control block 92 outputs a control signal to the VOA 67 and can recognize that the VOA 67 is open. If the voltage controlling the VOA 67 reaches a level for opening the VOA 67, the interstage loss control block 92 recognizes that the VOA 67 is open. The amount of loss obtained when the VOA 67 is open can be known in advance, such as in the design phase, and stored in memory. The values of Ldm and Lm are determined in advance as requirements and stored in memory.

In the configuration given above, the VOA 59 alone absorbs the AMP gain, but the VOA 67 may also be used to absorb the AMP gain. In that case, the target value L2 is given by expression (15) below:

$$L2 = Ldm + Lvdl + VOA\text{-absorption} \quad (15)$$

VOA-absorption represents the amount of AMP gain absorbed by the VOA 67. The threshold of the expression (14) is given by expression (16) below:

$$Lth = Ldm + Lvdl + Lm + VOA\text{-absorption} \quad (16)$$

For instance, the lower limit Gm of the gain between the PD 53 and the PD 66 is stored in memory in advance, and if the target value G1 of the gain between the PD 53 and the PD 66 falls below the lower limit Gm, VOA-absorption is set to Gm−G1 and the gain is absorbed by the VOA 67. This Gm is output as the target value G1 to the AGC 91. Even if the target value of gain falls below the lower limit, a corresponding amount of loss is absorbed by the VOA 67, and NF degradation of the VOA 59 can be avoided.

Safety optical level control and the restoration of connection will next be described. When a disconnection is detected, the interstage loss control block 92 performs safety optical level control so that a great level of light is not output to the stage (terminal 81) preceding the user-detachable DCF 82. More specifically, the PD 66 monitors the level of light before the VOA 67, and the AGC 91 controls the gain of the EDF 56 and the EDF 64 so that a safety level of light is obtained at the terminal 81.

When a disconnection is detected, the VOA 67 is open, and the interstage loss control block 92 determines the level of light to be detected by the PD 66 in accordance with the amount of loss caused by the open VOA 67 stored in memory. The level of light that should be detected by the PD 66 when a safety level of light is obtained before the DCF 82 is given by expression (17) below:

$$PDs = Psafe + Lvdl \quad (17)$$

where, PDs represents the level of light that should be detected by the PD 66; Psafe represents a safety level of light that should be output from the VOA 67; and Lvdl represents an amount of loss produced when the VOA 67 is open. When a disconnection is detected, the interstage loss control block 92 controls the AGC 91 so that the level of light meeting the expression (17) is detected by the PD 66. The value of Psafe is stored in memory in advance.

When a disconnection is detected, the interstage loss control block 92 also turns off the AGC 93. This prevents the output from increasing excessively at the terminal 81, so that the operation of the AMP gain control block 96 stops and the updating of the target value G1 of the AGC 91 also stops.

When the DCF 82 is connected to the terminals 81 and 83, the amount of loss across the DCF 82 decreases. The interstage loss control block 92 monitors the amount of loss caused by the VOA 67 and the DCF 82 by means of the PD 66 and the PD 72. When the amount of loss falls below the restoration threshold, the interstage loss control block 92 recognizes that the connection is restored. The restoration threshold is given by expression (18) below.

$$Lret = Ldm + Lvdl - Lm \quad (18)$$

where, Lret represents the restoration threshold at which the restoration of connection is detected; Ldm represents the maximum allowable value of loss in the stage between the terminals 81 and 83; Lvdl represents a value of loss produced when the VOA 67 is open; and Lm represents a connection restoration detection margin. These values are stored in memory in advance. The optical amplifier shown in FIG. 8 operates as described above.

A connection and disconnection of the DCF 82 can be detected in accordance with the amount of attenuation by the DCF 82 by means of the PD 66 of the front optical amplification block 50 and the PD 72 of the back optical amplification block 70, without providing a PD before the DCF 82. Accordingly, SN degradation can be avoided, and the power consumption can be reduced.

Because no PD is required before the DCF 82, the cost can be reduced.

An example hardware configuration of the optical amplifier will be described next.

Figure 10:
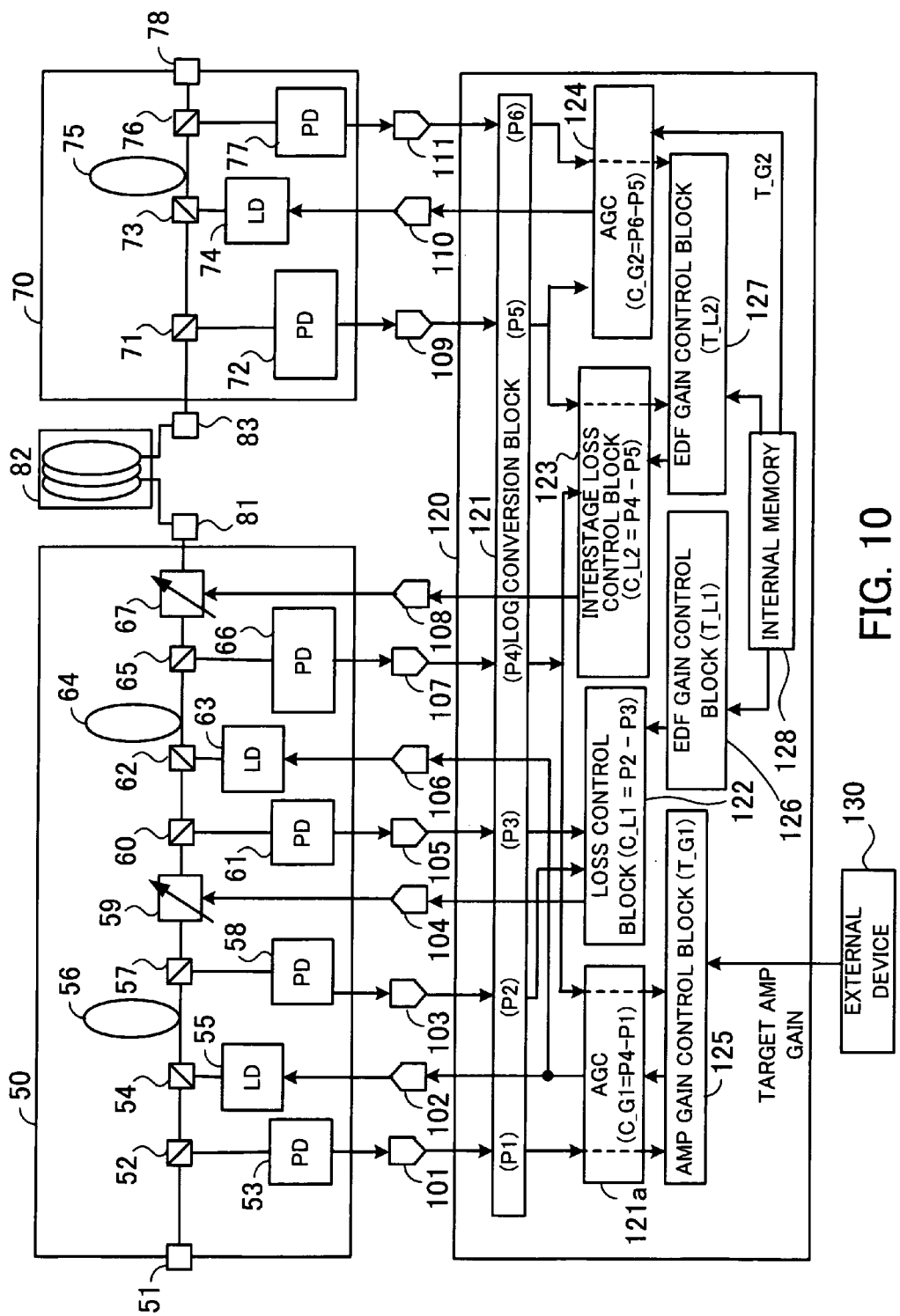
FIG. 10 shows an example hardware configuration of the optical amplifier.

FIG. 10 shows a hardware configuration of the optical amplifier. Elements identical to elements shown in FIG. 8 are denoted by the same reference numerals, and a description of those identical elements will be omitted. Although some elements shown in FIG. 10 do not correspond to the elements shown in FIG. 8, the overall function is the same:

the VOA 59 absorbs the AMP gain; a constant level of interstage loss is kept by the VOA 67; and a target level of signal light is output from the output terminal 78.

A computation device 120 shown in FIG. 10 is a single semiconductor chip or a microprocessor. The computation device 120 may also include analog-to-digital converters (ADCs) 101, 103, 105, 107, 109, and 111, and digital-to-analog converters (DACs) 102, 104, 106, 108, and 110.

A LOG conversion block 121 in the computation device 120 converts digitally converted PD data to a log value. In the shown example, digitally converted data of the PDs 53, 58, 61, 66, 72, and 77 are converted log values P1, P2, P3, P4, P5, and P6 (dBm).

An AGC 121a calculates a gain C_G1 between the stage preceding the EDF 56 and the stage following the EDF 64. The gain C_G1 is given by expression (19) below:

$$C\_G1 = P4 - P1 \quad (19)$$

An AMP gain control block 125 calculates such a target value T_G1 of the AGC 121a that a target level of light is kept after the EDF 64. The target value T_G1 is given by expressions (20) and (21) below:

$$T\_G1 = T\_G1 + \Delta G1 \quad (20)$$

$$\Delta G1 = C\_G1 - C\_L2 + C\_G2 - \text{target-AMP-gain} \quad (21)$$

where, C_L2 represents an interstage loss caused by the VOA 67 and the DCF 82, and C_G2 represents the gain of the EDF 75. C_L2 and C_G2 are kept to a constant level, that is, C_G1 is kept to a constant level. An external device 130 calculates such a target AMP gain that a constant level of output is kept by the optical amplifier, and the AMP gain control block 125 may have the same function.

The AGC 121a controls the ID 55 and the LD 63 so that the gain C_G1 matches the target value T_G1 calculated by the AMP gain control block 125.

A loss control block 122 calculates the amount of loss C_L1 before and after the VOA 59. C_L1 is given by expression (22) below:

$$C\_L1 = P2 - P3 \quad (22)$$

An EDF gain control block 126 calculates such an amount of loss caused by the VOA 59 that the total gain of the EDF 56 and the EDF 64 is kept constant. The target value T_L1 of the amount of loss is given by expressions (23) and (24) below:

$$T\_L1 = T\_L1 - \Delta L1 \quad (23)$$

$$\Delta L1 = C\_G1 + C\_L1 - EDFfg \quad (24)$$

EDFflg is stored in an internal memory 128 in advance.

The loss control block 122 controls the VOA 59 so that the amount of loss C_L1 matches the target value T_L1 calculated by the EDF gain control block 126.

An interstage loss control block 123 calculates an amount of loss C_L2 between the VOA 67 and the DCF 82. C_L2 is given by expression (25) below:

$$C\_L2 = P4 - P5 \quad (25)$$

An AGC 124 calculates the gain C_G2 of the EDF 75. C_G2 is given by expression (26) below:

$$C\_G2 = P6 - P5 \quad (26)$$

The AGC 124 controls the LD 74 so that the gain C_G2 matches the target gain T_G2 (fixed value) stored in the internal memory 128.

An EDF gain control block 127 calculates such an amount of loss caused by the VOA 67 that the gain of the EDF 75 is kept constant. The target value T_L2 of the amount of loss is given by expressions (27) and (28) below:

$$\Delta L2 = T\_L2 - \Delta L2 \quad (27)$$

$$\Delta T\_L2 = C\_G2 + C\_L2 - EDFflg \quad (28)$$

EDFflg is stored in the internal memory 128 in advance.

The interstage loss control block 123 controls the VOA 67 so that the amount of loss C_L2 matches the target value T_L2 calculated by the EDF gain control block 127. The gain C_G2 included in the expression (28) is a fixed value, and the interstage loss control block 123 functions to keep the amount of loss caused by the VOA 67 and the DCF 82 constant.

The gain of signal light is controlled in this way to keep the amount of loss between the VOA 67 and the DCF 82 constant.

A third embodiment of the present invention will be described in detail with reference to drawings. The third embodiment differs from the second embodiment in that the front optical amplification block 50 and the back optical amplification block 70 are interchanged.

Figure 11:
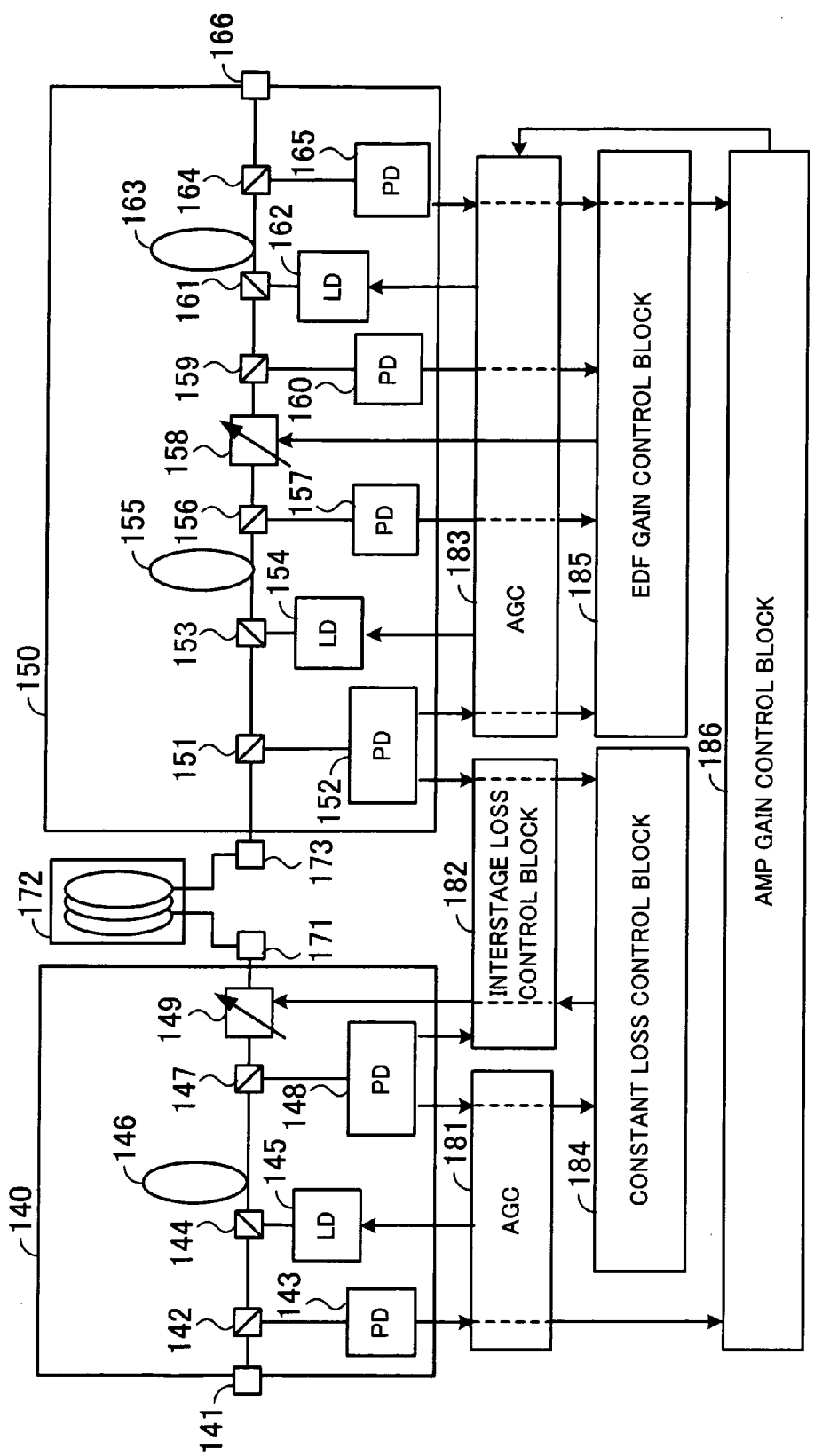
FIG. 11 shows an optical amplifier of a third embodiment.
Figures 13A, 13B:
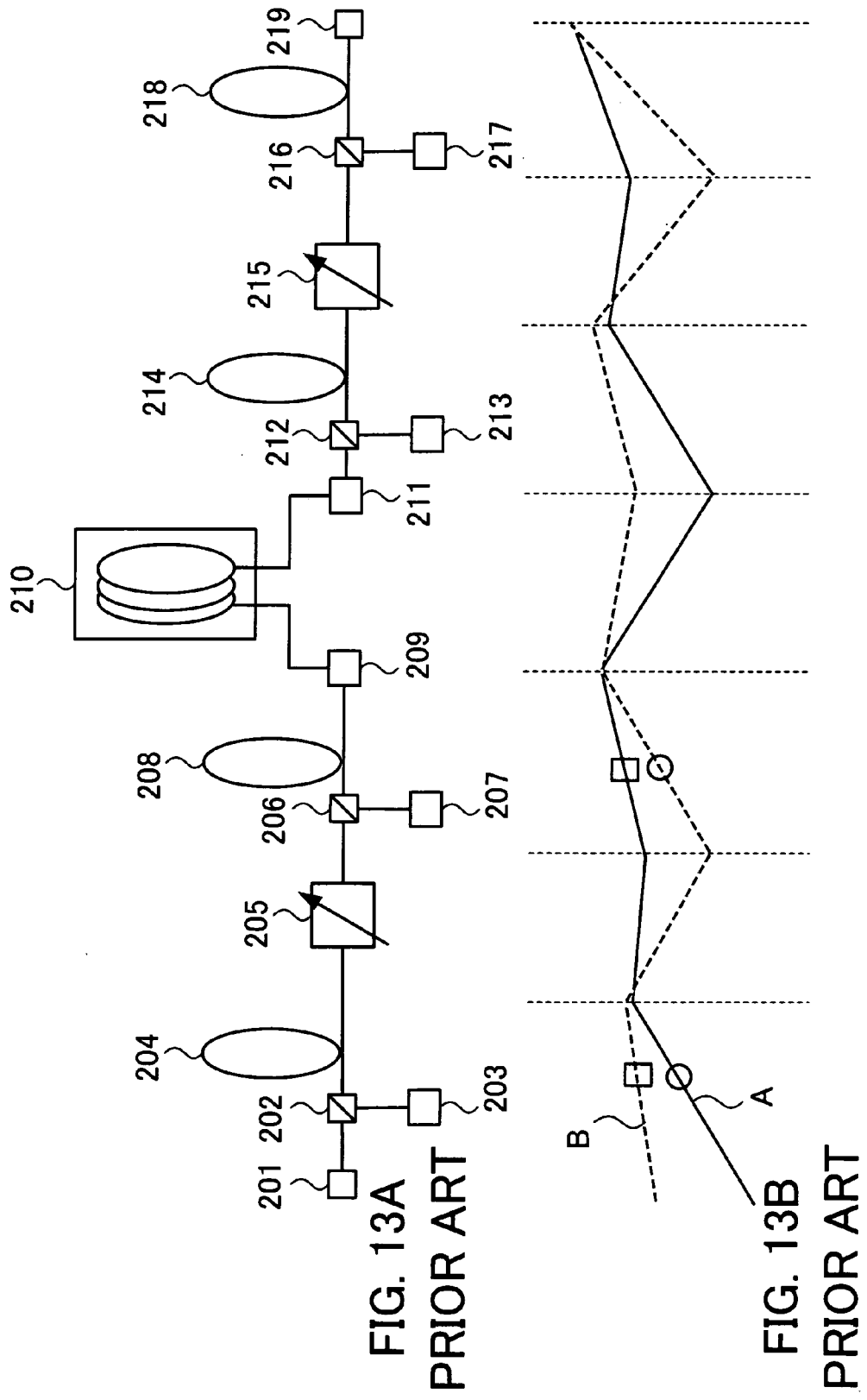
FIGS. 13A and 13B show the operation of a conventional optical amplifier.
Figures 14A, 14B:
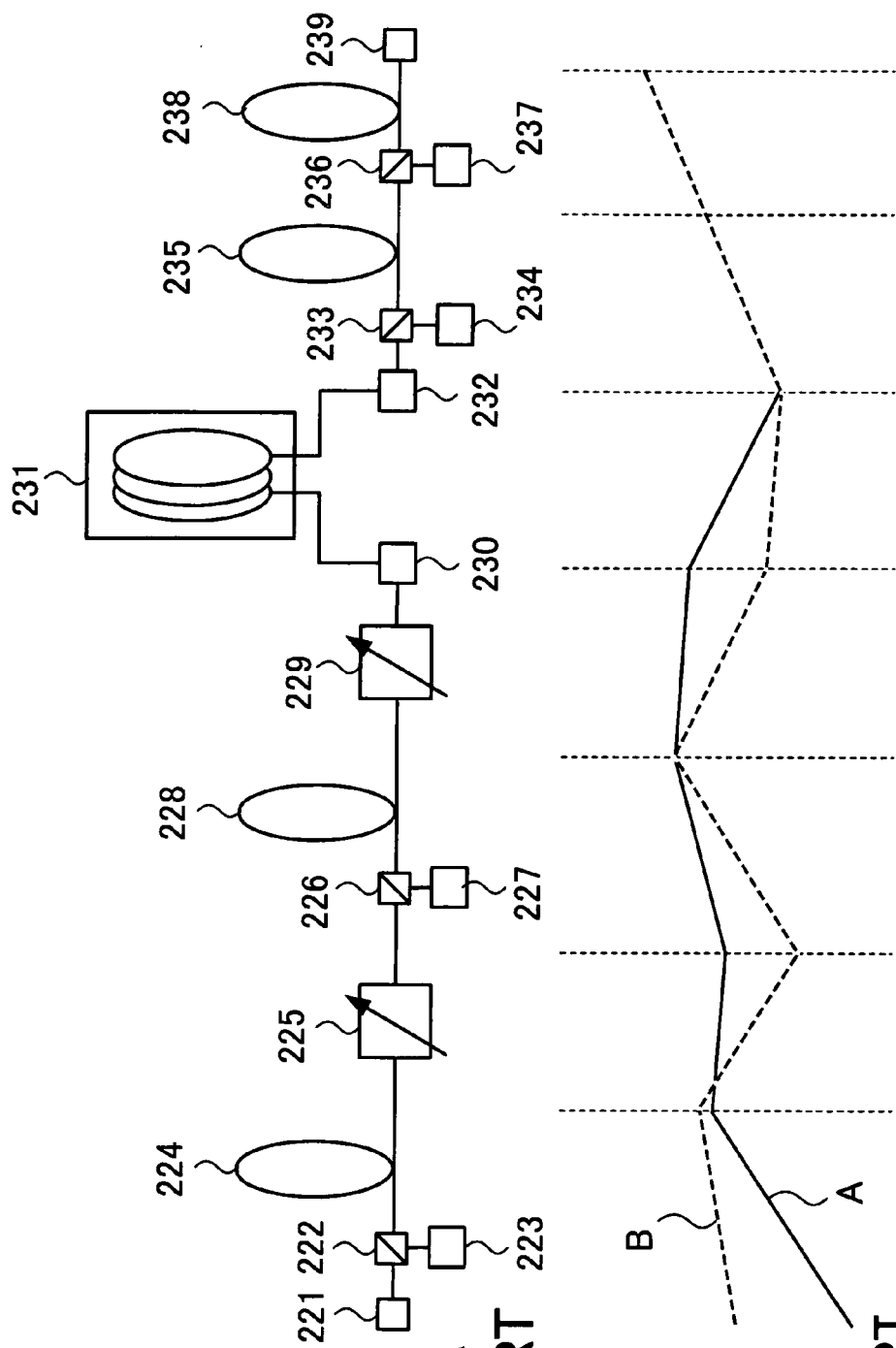
FIGS. 14A and 14B show the operation of an optical amplifier including a VOA and a DCF connected in series.
Figure 15:
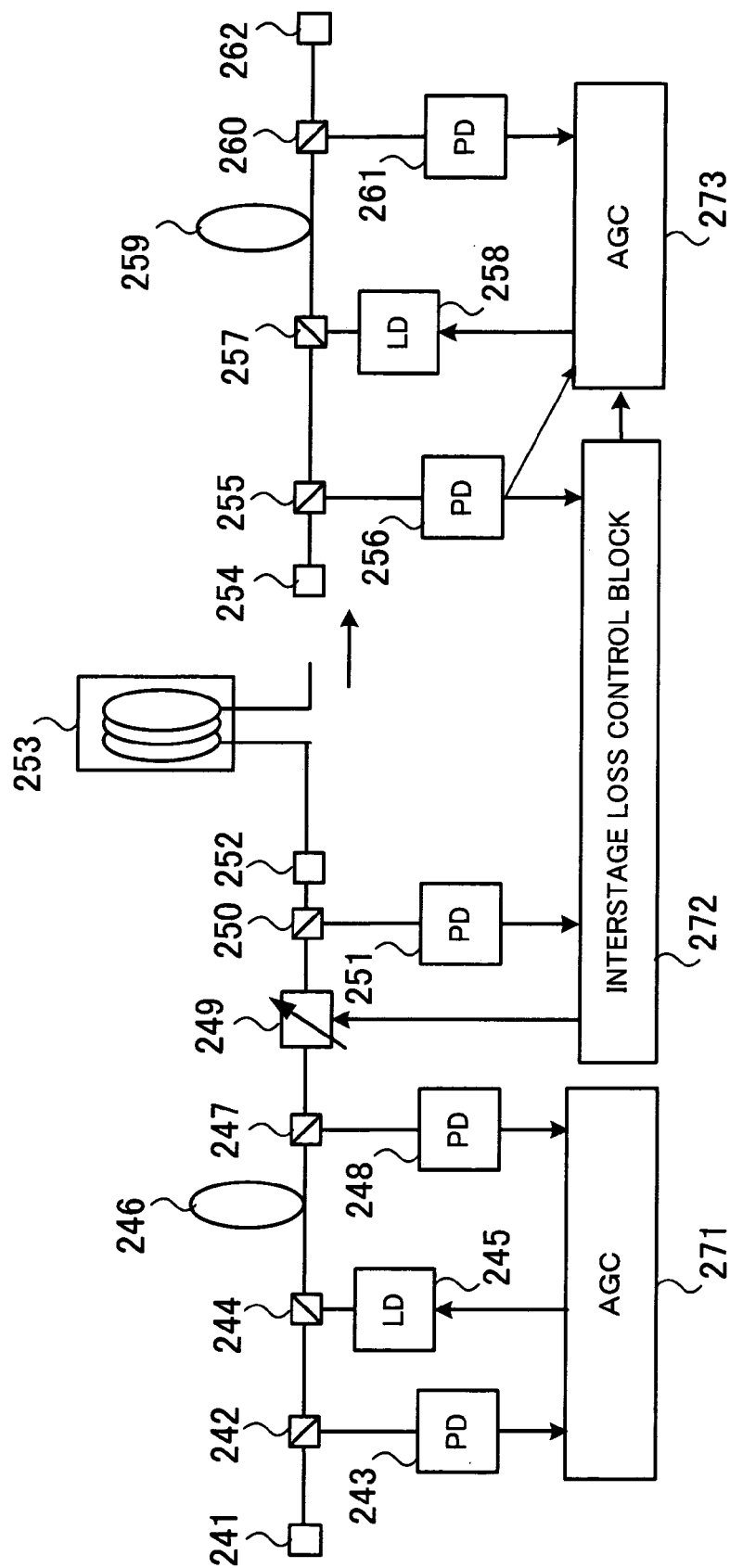
FIG. 15 is a block diagram of an optical amplifier which can detect the connection or disconnection of a DCF.

FIG. 11 shows an optical amplifier of the third embodiment. As shown in the figure, the optical amplifier includes a front optical amplification block 140, a back optical amplification block 150, a DCF 172 connected to terminals 171 and 173, AGCs 181 and 183, an interstage loss control block 182, a constant loss control block 184, an EDF gain control block 185, and an AMP gain control block 186.

The front optical amplification block 140 includes an input terminal 141, couplers 142, 144, and 147, PDs 143 and 148, an LD 145, and an EDF 146. The back optical amplification block 150 includes couplers 151, 153, 156, 159, 161, and 164, PDs 152, 157, 160, and 165, LDs 154 and 162, EDFs 155 and 163, a VOA 158, and an output terminal 166. The front optical amplification block 140 is analogous to the back optical amplification block 70 shown in FIG. 8, and a detailed description of the front optical amplification block 140 will be omitted. The back optical amplification block 150 is analogous to the front optical amplification block 50 shown in FIG. 8, and a detailed description of the back optical amplification block 150 will be omitted.

The AGC 181 operates so that the gain of the EDF 146 matches a fixed target value G1. The interstage loss control block 182 controls the VOA 149 so that the amount of loss caused by the VOA 149 and the DCF 172 matches a target value L1. The AGC 183 controls pumped light of the LD 154 and the LD 162 so that the gain between the stage preceding the EDF 155 and the stage following the EDF 163 matches a target value G2.

The constant loss control block 184 calculates the target value L1 such that the amount of loss caused by the VOA 149 and the DCF 172 becomes constant. The EDF gain control block 185 calculates such a target value L2 of the VOA 158 that the total gain of the EDF 155 and the EDF 163 is always kept constant. The AMP gain control block 186 calculates the target value G2 of the AGC 183 such that the constant level of light is kept at the output terminal 166.

The target value L1 calculated by the constant loss control block 184 is given by expression (29) below.

$$L1 = Ldm + Lvdl \quad (29)$$

Ldm represents the maximum allowable value of loss between the terminals 171 and 173. Lvdl represents the amount of loss when the VOA 149 is open.

The target value L2 calculated by the EDF gain control block 185 is given by expressions (30) and (31) below:

$$L2 = L2 - \Delta L2 \tag{30}$$

$$\Delta L2 = G2 + L2 - EDFfg \tag{31}$$

where, G2 represents a gain between the stage preceding the EDF 155 and the stage following the EDF 163; and L2 represents an amount of current loss caused by the VOA 158. "G2+L2" represents the total gain of the EDF 155 and the EDF 163. EDFfg represents the total gain of the EDF 155 and the EDF 163, which must be kept constant.

The target value G2 calculated by the AMP gain control block 186 is given by expressions (32) and (33):

$$G2 = G2 - \Delta G2 \tag{32}$$

$$\Delta G2 = (P6 - P1) - \text{target-AMP-gain} \tag{33}$$

"P6−P1" in the expression (33) represents a gain between the stage preceding the EDF 146 and the stage following the EDF 163, and target-AMP-gain represents a gain for obtaining a target level of signal light at the output terminal 166.

The operation of the optical amplifier shown in FIG. 11 will next be described.

FIGS. 12A and 12B are views given to describe the operation of the optical amplifier. FIG. 12A shows the optical amplifier shown in FIG. 11, omitting the AGCs 181 and 183, the interstage loss control block 182, the constant loss control block 184, the EDF gain control block 185, and the AMP gain control block 186.

FIG. 12B shows the level of signal light varying in different stages of the optical amplifier shown in FIG. 12A. The height of waveforms in FIG. 12B represents the level of light, and vertical dotted lines are separators between different stages of the optical amplifier shown in FIG. 12A.

Suppose that the level of signal light input to the input terminal 141 is as represented by waveform A and that the optical level per wave increases to increase the level of signal light input to the input terminal 141 as represented by waveform B.

Because the gain of the EDF 146 is kept constant, the gain of signal light at the EDF 146 is the same in waveforms A and B. The amount of loss caused by the VOA 149 and the DCF 172 is kept constant by the constant loss control function. Accordingly, different levels of signal light are input to the back optical amplification block 150. The AMP gain control block 186 controls the EDF 155 and the EDF 163 such that a target level of signal light is output from the output terminal 166. The EDF gain control block 185 controls the VOA 158 such that the total gain of the EDF 155 and the EDF 163 is kept constant.

If the amount of loss by the DCF 172 is reduced as shown in the figure from waveform C to waveform D, then the constant loss control block 184 increases the amount of loss by the VOA 149 such that the amount of loss caused by the VOA 149 and the DCF 172 is kept constant.

The optical amplifier operates in this way to obtain a constant EDF gain and the target level of signal light.

The operation to detect a disconnection will next be described. When a disconnection occurs, the amount of loss by the DCF 172 increases. This causes the constant loss control block 184 to function, decreasing the amount of loss by the VOA 149 and finally opening the VOA 149. If the amount of loss by the open VOA 149 and the DCF 172 exceeds a threshold, the interstage loss control block 182 recognizes that an interstage loss occurs. The threshold of interstage loss is given by expression (34) below:

$$Lth = Ldm + Lvdl + Lm \tag{34}$$

where, Lth represents a threshold at which a disconnection is detected; Ldm represents the maximum allowable value of loss between the terminals 171 and 173; Lvdl represents the amount of loss produced when the VOA 149 is open; and Lm represents a disconnection detection margin. The interstage loss control block 182 outputs a control signal to the VOA 149 and can recognize that the VOA 149 is open. When the voltage for controlling the VOA 149 reaches the voltage at which the VOA 149 opens, the interstage loss control block 182 recognizes that the VOA 149 is open. The amount of loss produced when the VOA 149 is open can be known in advance, such as in the design phase, and stored in memory. The values of Ldm and Lm are determined in advance as requirements and stored in memory in advance.

In the configuration described above, the VOA 158 absorbs the AMP gain of the optical amplifier. The VOA 149 may also be used to absorb the AMP gain. In that case, the target value L2 is given by expression (35) below:

$$L2 = Ldm + Lvdl + VOA\text{-absorption} \tag{35}$$

VOA-absorption represents the amount of loss absorbed by the VOA 149. The threshold of the expression (34) is given by expression (36) below:

$$Lth = Ldm + Lvdl + Lm + VOA\text{-absorption} \tag{36}$$

For instance, the lower limit Gm of the gain between the PD 152 and the PD 156 is stored in memory in advance, and if the target value G2 of the gain between the PD 152 and the PD 165 falls below the lower limit Gm, VOA-absorption is set to Gm−G2 and the gain is absorbed by the VOA 149. This Gm is output as the target value G2 to the AGC 183. Even if the target value of the gain falls below the lower limit, a corresponding amount of loss is absorbed by the VOA 149, and NF degradation of the VOA 158 can be avoided.

Safety optical level control and the restoration of connection will next be described. When a disconnection is detected, the interstage loss control block 182 performs safety optical level control such that a great level of light is not output to the stage (terminal 171) preceding the user-detachable DCF 172. More specifically, the PD 148 monitors the level of light before the VOA 149, and the AGC 181 controls the gain of the EDF 146 such that a safety level of light is obtained at the terminal 171.

The interstage loss control block 182 determines the level of light that should be detected by the PD 148, in accordance with the amount of loss of the open VOA 149 stored in memory. The light of level that should be detected by the PD 148 such that a safety level of light is obtained in the stage preceding the DCF 172 is given by expression (37) below:

$$PDs = Psafe + Lvdl \tag{37}$$

where, PDs represents the level of light that should be detected by the PD 148; Psafe represents a safety level of light that should be output from the VOA 149; and Lvdl represents the amount of loss produced when the VOA 149 is open. When a disconnection is detected, the interstage loss control block 182 controls the AGC 181 such that the PD 148 detects the level of light meeting the expression (37).

When the DCF 172 is connected to the terminals 171 and 173, the amount of loss across the DCF 172 decreases. The interstage loss control block 182 monitors the amount of loss caused by the VOA 149 and the DCF 172 by means of the PD 148 and the PD 152. When the amount of loss falls below a restoration threshold, the interstage loss control block 182 recognizes that the connection is restored. The restoration threshold is given by expression (38) below:

$$Lret = Ldm + Lvdl - Lm \qquad (38)$$

where, Lret represents the restoration threshold at which the restoration of the connection is detected; Ldm represents the maximum allowable amount of interstage loss between the terminals 171 and 173; Lvdl represents the amount of loss produced when the VOA 149 is open; and Lm represents a restoration detection margin.

A connection or disconnection of the DCF 172 can be detected in accordance with the amount of attenuation by the DCF 172 by means of the PD 148 of the front optical amplification block 140 and the PD 152 of the back optical amplification block 150, eliminating the need for providing a PD before the DCF 172. Accordingly, SN degradation can be avoided, and the power consumption can be reduced.

Because no PD is required before the DCF 172, the cost can also be reduced.

An optical amplifier according to the present invention detects the amount of attenuation caused by a variable optical attenuator and an external attenuating medium by means of a front optical detection section of a front optical amplification block connected before the variable optical attenuator and the external attenuating medium connected in series and a back optical detection section of a back optical amplification block connected after the variable optical attenuator and the external attenuating medium, and performs control to keep a constant amount of signal light attenuation. A connection or disconnection of the external attenuating medium is detected in accordance with the amount of attenuation caused by the variable optical attenuator and the external attenuating medium when the amount of attenuation caused by the variable optical attenuator is minimized. Because the amount of attenuation caused by the variable optical attenuator is constant after it reaches the minimum, the connection or disconnection of the external attenuating medium can be detected in accordance with the amount of attenuation before and after the external attenuating medium, without providing any optical detection section before or after the external attenuating medium. SN degradation can be prevented, the cost effectiveness will not be degraded because of an increase in LD power, and the power consumption can be reduced by LD temperature control.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. An optical amplifier having a variable optical attenuator and an external attenuating medium connected in series, the optical amplifier comprising:

an attenuation amount detection means for detecting an attenuation amount of signal light, caused by the variable optical attenuator and the external attenuating medium, by means of a front optical detection means of a front optical amplification block provided before the variable optical attenuator and the external attenuating medium and a back optical detection means of a back optical amplification block provided after the variable optical attenuator and the external attenuating medium;

an attenuation amount control means for controlling the variable optical attenuator such that the attenuation amount of signal light is kept constant; and a connection detection means for detecting a connection or disconnection of the external attenuating medium, depending on the attenuation amount of signal light detected while the variable optical attenuator provides a minimum amount of attenuation.

2. The optical amplifier according to claim 1, wherein the connection detection means detects a disconnection of the external attenuating medium when the attenuation amount of signal light exceeds at least the sum of the minimum amount of attenuation caused by the variable optical attenuator and the allowable amount of attenuation caused by the external attenuating medium.

3. The optical amplifier according to claim 2, wherein the minimum amount of attenuation caused by the variable optical attenuator and the allowable amount of attenuation caused by the external attenuating medium are stored in memory.

4. The optical amplifier according to claim 1, wherein the connection detection means detects a connection of the external attenuating medium when the attenuation amount of signal light falls below at least the sum of the minimum amount of attenuation caused by the variable optical attenuator and the allowable amount of attenuation caused by the external attenuating medium.

5. The optical amplifier according to claim 4, wherein the minimum amount of attenuation caused by the variable optical attenuator and the allowable amount of attenuation caused by the external attenuating medium are stored in memory.

6. The optical amplifier according to claim 1, further comprising a safety light control means for controlling the front optical amplification block such that a safety level of signal light is output from the stage preceding the external attenuating medium, with reference to the level of light of the front optical detection means when the connection detection means detects a disconnection of the external attenuating medium.

7. The optical amplifier according to claim 1, further comprising an amplification block turn-off means for turning off the back optical amplification block when the connection detection means detects a disconnection of the external attenuating medium.

8. The optical amplifier according to claim 2, wherein, when the amount of attenuation caused by the variable optical attenuator is increased to absorb a gain for the signal light, the increase in the amount of attenuation is added to the sum.

9. The optical amplifier according to claim 1, wherein the external attenuating medium is a dispersion compensating optical fiber.

10. An optical amplifier having a variable optical attenuator and an external attenuating medium connected in series, the optical amplifier comprising:

an attenuation amount detection unit detecting an attenuation amount of signal light, caused by the variable optical attenuator and the external attenuating medium, with a front optical detection unit provided before the variable optical attenuator and the external attenuating medium and a back optical detection unit provided after the variable optical attenuator and the external attenuating medium;

an attenuation amount control unit controlling the variable optical attenuator such that the attenuation amount of signal light is kept constant; and a connection detection unit detecting a connection or disconnection of the external attenuating medium, depending on the attenuation amount of signal light detected while the variable optical attenuator provides a minimum amount of attenuation.

* * * * *